(12) United States Patent
Nakajima et al.

(10) Patent No.: US 8,954,706 B2
(45) Date of Patent: Feb. 10, 2015

(54) STORAGE APPARATUS, COMPUTER SYSTEM, AND CONTROL METHOD FOR STORAGE APPARATUS

(75) Inventors: Noriko Nakajima, Machida (JP); Akihisa Nagami, Yokohama (JP); Toru Tanaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 13/500,019

(22) PCT Filed: Mar. 21, 2012

(86) PCT No.: PCT/JP2012/001955
§ 371 (c)(1),
(2), (4) Date: Apr. 3, 2012

(87) PCT Pub. No.: WO2013/140446
PCT Pub. Date: Sep. 26, 2013

(65) Prior Publication Data
US 2013/0254500 A1   Sep. 26, 2013

(51) Int. Cl.
*G06F 12/00* (2006.01)
(52) U.S. Cl.
USPC ........... 711/170; 711/111; 711/112; 711/114; 711/154; 711/162
(58) Field of Classification Search
CPC ..... G06F 3/0631; G06F 3/067; G06F 9/5016; G06F 12/023; G06F 12/0631; G06F 12/067; G06F 12/109

USPC .......... 711/162, 170, E12.002, E12.103, 111, 711/112, 114, 154
See application file for complete search history.

(56) References Cited

U.S. PATENT DOCUMENTS

| 8,316,181 | B2 * | 11/2012 | Galloway et al. ............. 711/114 |
| 2010/0186014 | A1 | 7/2010 | Vaghani et al. |
| 2011/0197023 | A1 | 8/2011 | Iwamitsu et al. |
| 2012/0005402 | A1 * | 1/2012 | Yamamoto et al. ........... 711/103 |

FOREIGN PATENT DOCUMENTS

WO   WO 2010/106574 A1   9/2010

OTHER PUBLICATIONS

PCT International Search Report and Written Opinion on application PCT/JP2012/001955 mailed Aug. 30, 2012; 12 pages.

* cited by examiner

*Primary Examiner* — Reginald Bragdon
*Assistant Examiner* — Mehdi Namazi
(74) *Attorney, Agent, or Firm* — Foley & Lardner LLP

(57) ABSTRACT

A storage apparatus of an embodiment of the invention including one or more storage drives for providing real storage resources and a controller for controlling the one or more storage drives and accesses from a host computer. The controller initializes real storage resources and manages the initialized real storage resources. The controller receives an instruction for allocating an initialized real storage resource to a first virtual storage resource accessed by the host computer. In response to the instruction, the controller allocates a first initialized real storage resource which has been initialized in advance prior to the instruction to the first virtual storage resource.

14 Claims, 28 Drawing Sheets

| VIRTUAL STORAGE AREA CONFIGURATION INFORMATION | | |
|---|---|---|
| 10011 | 10012 | 10013 |
| COMMUNICATION INTERFACE IDENTIFICATION INFORMATION | VIRTUAL STORAGE AREA IDENTIFICATION INFORMATION | POOL IDENTIFICATION INFORMATION |
| 50:00:01:1E:0A:E8:01 | VD-01 | PL-01 |
| 50:00:01:1E:0A:E8:01 | VD-02 | PL-01 |
| 50:00:01:1E:0A:E8:02 | VD-03 | PL-01 |
| ... | ... | ... |

Fig. 7

POOL CONFIGURATION INFORMATION (1002)

| POOL IDENTIFICATION INFORMATION (10021) | LOGICAL STORAGE AREA IDENTIFICATION INFORMATION (10022) |
|---|---|
| PL-01 | LD-01 |
| PL-01 | LD-02 |
| PL-01 | LD-03 |
| PL-02 | LD-04 |
| PL-02 | LD-05 |
| ... | ... |

Fig. 9

VIRTUAL STORAGE AREA PAGE ALLOCATION INFORMATION (1004)

| VIRTUAL STORAGE AREA INFORMATION (10041) | | | | LOGICAL STORAGE AREA INFORMATION (10042) | |
|---|---|---|---|---|---|
| VIRTUAL STORAGE AREA IDENTIFICATION INFORMATION | PAGE ARRAY | PAGE IDENTIFICATION INFORMATION | ALLOCATION STATUS | LOGICAL STORAGE AREA IDENTIFICATION INFORMATION | PAGE ARRAY |
| VD-01 | 1 | 0002 | Allocated | LD-01 | 1 |
| VD-01 | 2 | 0012 | Allocated | LD-01 | 2 |
| VD-01 | 3 | 0034 | Allocated | Null | Null |
| VD-02 | 1 | 0173 | Allocated | Null | Null |
| VD-02 | 2 | 0392 | Allocated | LD-01 | 3 |
| ... | ... | ... | ... | ... | ... |
| 10043 | 10044 | 10045 | 10046 | 10047 | 10048 |

Fig. 10

| LOGICAL STORAGE AREA IDENTIFICATION INFORMATION 10051 | PAGE IDENTIFICATION INFORMATION 10052 | ZERO WRITE STATUS 10053 |
|---|---|---|
| | \multicolumn{2}{c}{ZERO DATA MANAGEMENT INFORMATION 1005} |

| LOGICAL STORAGE AREA IDENTIFICATION INFORMATION | PAGE IDENTIFICATION INFORMATION | ZERO WRITE STATUS |
|---|---|---|
| LD-01 | 0001 | zero |
| | 0002 | zero |
| | 0323 | not zero |
| LD-02 | 0684 | zero |
| | 0386 | zero |
| | 0913 | not zero |
| ... | ... | ... |

| VIRTUAL DISK CREATION METHOD APPLICATION STATUS | | |
|---|---|---|
| 10061 | 10062 | 10063 |
| VIRTUAL STORAGE AREA IDENTIFICATION INFORMATION | PAGE IDENTIFICATION INFORMATION | ZERO WRITE OMISSION APPLICATION STATUS |
| VD-01 | 0002 | Applied |
| | 0012 | Not applied |
| | 0034 | Applied |
| VD-02 | 0173 | Applied |
| | 0392 | Not applied |
| ... | ... | ... |

Fig. 16

STORAGE VOLUME PAGE ALLOCATION INFORMATION 5002

| VIRTUAL MACHINE IDENTIFICATION INFORMATION 50021 | VIRTUAL DISK IDENTIFICATION INFORMATION 50022 | STORAGE VOLUME INFORMATION 50023 | | VIRTUAL STORAGE AREA INFORMATION 50024 | |
|---|---|---|---|---|---|
| | | STORAGE VOLUME IDENTIFICATION INFORMATION | PAGE ARRAY | VIRTUAL STORAGE AREA IDENTIFICATION INFORMATION | PAGE ARRAY |
| VM-01 | 1 | /data1 | 1 | VD-01 | 1 |
| VM-02 | 2 | /data2 | 1 | VD-02 | 1 |
| | | /data2 | 2 | VD-02 | 2 |
| ... | ... | ... | ... | ... | ... |
| | | 50025 | 50026 | 50027 | 50028 |

STORAGE APPARATUS, COMPUTER SYSTEM, AND CONTROL METHOD FOR STORAGE APPARATUS

DESCRIPTION

1. Technical Field

This invention relates to a storage apparatus, a computer system, and a control method for the storage apparatus and, in particular, relates to initialization of real storage resources in the storage apparatus.

2. Background Art

In the field of storage technology, thin provisioning has been employed (for example, refer to PTL1, WO 2010/106574 A). The thin provisioning preliminarily provides a host computer with a virtual storage volume instead of a physical disk volume and, upon occurrence of a write from the host, dynamically allocates a physical page from a pool area. In the thin provisioning, another technique has also been known that provisionally allocates physical pages and alters one of the provisionally allocated pages into a formally allocated one upon occurrence of a write.

By virtue of the thin provisioning, a storage resource pool can be predefined to have a capacity smaller than a virtual volume, resulting in higher capacity utilization. In addition, increasing the capacity of the pool does not affect the host computer; consequently, operation can be simplified to achieve lower administrative workload.

In the meanwhile, a file system (for example, VMFS) used in a virtual environment (for example, a VMware environment) does not adopt thin provisioning method, but adopts thick virtual disk method that allocates disk areas to the entire area of the created virtual disk.

In the thick virtual disk method, the VMFS uses a disk space in the amount of the entire capacity of the virtual disk. Since the disk capacity does not change in the VMFS, performance capability of the file system is superior, compared with a thin virtual disk to which the thin provisioning has been applied (a thin-provisioned virtual disk). The thick virtual disk is also suitable for a situation where a higher protection level is required, for example, in configuring a cluster, because the disk securely has a physical data area reserved for actual need.

There are two types of thick virtual disks: eager zeroed thick virtual disks and lazy zeroed thick virtual disks. The eager zeroed thick formatting allocates an area for the size of the capacity of the virtual disk and further writes zeros to (initializes) the entire area in creation of the virtual disk. The lazy zeroed thick formatting allocates an area for the size of the capacity of the virtual disk but does not write zeros in creation of the virtual disk. The lazy zeroed thick formatting performs zero write at the first write request but before the data write.

The eager zeroed thick formatting takes more time to create a virtual disk than the lazy zeroed thick formatting because of zero write at creation of a virtual disk, but eager zeroed thick disks show faster first write performance than a lazy zeroed thick disk.

To apply FT (fault-tolerant) configuration for operating virtual machines while synchronizing primary machines with secondary machines, the eager zeroed thick is essential. Other than the FT, the eager zeroed thick format is suitable for operation to minimize a down time at a server failure, like in HA (high availability).

Recent popularity of large-scale virtual data centers to operate thousands to several ten thousands of virtual machines has demanded a technique to create virtual machines at high speed. In addition, under prevalence of virtualization, it is anticipated that virtualization of applications requiring high security level will expand. Accordingly, it is necessary to create virtual machines including eager zeroed thick virtual disks at high speed. Furthermore, as applications are becoming more diverse, it is demanded to provide access performance required by virtual machines or virtual disks.

CITATION LIST

Patent Literature

PTL 1: WO 2010/106574 A

SUMMARY OF INVENTION

Technical Problem

The eager zeroed thick formatting writes zeros to all pages allocated to a virtual disk at creation of the virtual disk. Accordingly, compared with a lazy zeroed thick virtual disk or a thin virtual disk, there arises a problem that it takes much longer time to create a disk. In the case of a 10-GB virtual disk, area allocation takes microseconds; however, zero-writing takes approximately 10 minutes.

To solve this problem, there exists a technique to offload the zero-writing from a host computer to a storage apparatus. The offload function to a storage apparatus is a function to effectively utilize various functions owned by the storage apparatus, which is an external storage apparatus used as data storage, in cooperation with a hypervisor of a host computer. However, this offload function can have an effect to reduce the time by only 10%, compared with the zero-writing in the host computer.

The offloading the zero-writing to the storage apparatus is configured in such a way that a host computer issues a Write Same (a command to write zeros) to the storage apparatus; consequently, the storage apparatus understands the command to just write zeros. For example, even if zeros had already been written to pages in a designated pool, the storage apparatus cannot control itself o omit zero-writing, so that useless zero-writing is performed.

Solution to Problem

An aspect of this invention is a storage apparatus including one or more storage drives for providing real storage resources and a controller for controlling the one or more storage drives and accesses from a host computer. The controller initializes real storage resources and manages the initialized real storage resources. The controller receives an instruction for allocating an initialized real storage resource to a first virtual storage resource accessed by the host computer. In response to the instruction, the controller allocates a first initialized real storage resource which has been initialized in advance prior to the instruction to the first virtual storage resource.

Advantageous Effects of Invention

An aspect of this invention achieves efficient initialization of storage resources in a storage apparatus.

BRIEF DESCRIPTION OF DRAWINGS

FIG. 6 is a drawing illustrating a configuration example of virtual storage area configuration information in the first embodiment.

FIG. 7 is a drawing illustrating a configuration example of pool configuration information in the first embodiment.

FIG. 9 is a drawing illustrating a configuration example of virtual storage area page allocation information in the first embodiment.

FIG. 10 is a drawing illustrating a configuration example of zero data management information in the first embodiment.

FIG. 11 is a drawing illustrating a configuration example of virtual disk creation method application status in the first embodiment.

FIG. 16 is a drawing illustrating a configuration example of storage volume page allocation information in the first embodiment.

DESCRIPTION OF EMBODIMENTS

Figure 1:
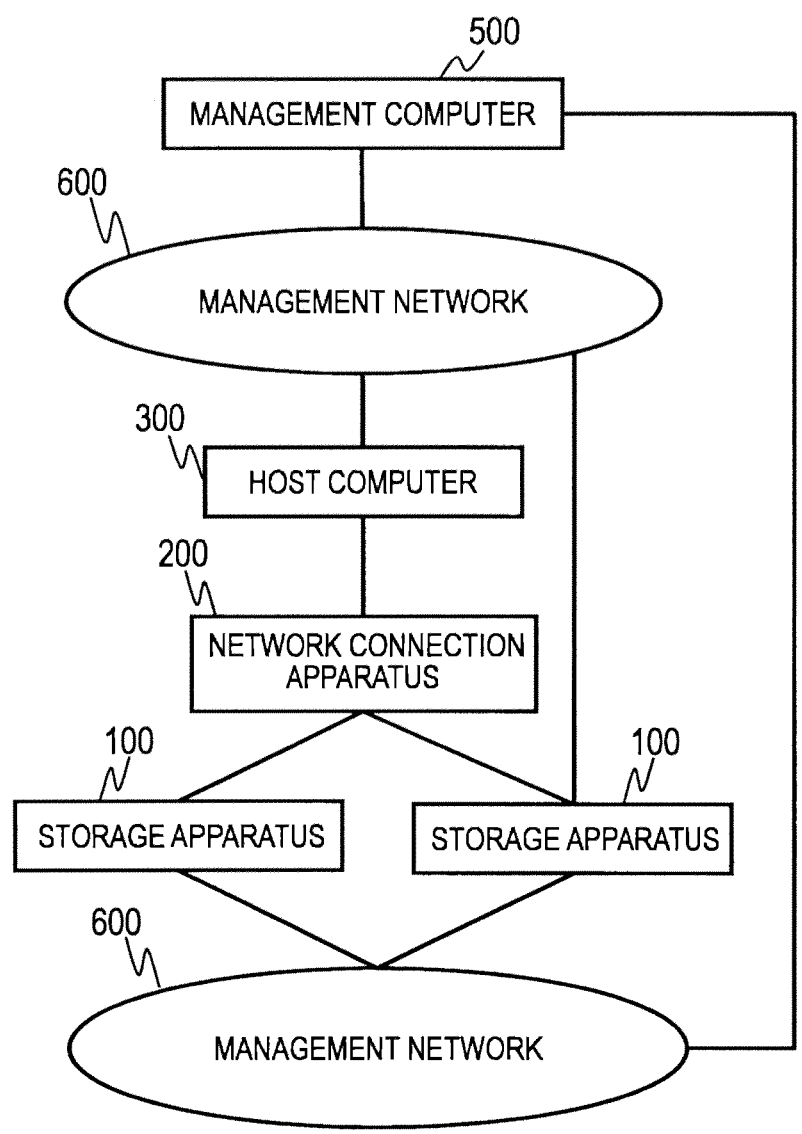
FIG. 1 is a drawing schematically illustrating a configuration example of a virtual environment management network in the first embodiment.

Hereinafter, embodiments of this invention will he described with reference to the accompanying drawings. The elements having substantially the same functions may be denoted by the same reference signs. The accompanying drawings illustrate specific embodiments and implementations based on the principle of this invention; however, these are provided to understand this invention and should never be used for limited interpretation of this invention.

Although the embodiments describe this invention in sufficient details for those skilled in the art to practice the invention, it should be understood that other implementations or embodiments are available including changes and modifications of the structures or configurations and replacement of various elements, without departing from the scope and spirit of the technical ideas of this invention. Accordingly, the following descriptions should not be interpreted as limitations to the embodiments.

Furthermore, as will be described later, the embodiments of this invention may be implemented by software running on a general-purpose computer, dedicated hardware, or combination of software and hardware.

In the following descriptions, information in the embodiments is explained by means of the form of tables. However, the information does not need to be expressed in a data structure of table but may be expressed in a data structure of database, list, queue, or any other one. For this reason, in order to indicate independency from the data structure, the table, list, database, or queue may be merely referred to as information. To describe details of the information, terms such as identification information, identifier, name, and ID can be used but they may be replaced with one another.

Although the following explanations on processing in the embodiments of this invention will be provided with subjects (agents) of program, they may have the subjects of processor because a processor executes a program using memories and communication ports (communication control apparatuses) to perform predetermined processing.

The processing disclosed with subjects of program may be regarded as processing performed by a computer such as a management computer or an information processing apparatus. The programs, for all or a part of them, may be implemented by dedicated hardware or may consist of modules. The programs can be installed in the computers or information processing apparatuses through a program distribution server or a non-transitory storage medium.

The processor works in accordance with a program to work as an operation part for implementing a predetermined function. For example, a processor operates in accordance with a control program to function as a controller and operates in accordance with a management program to function as a management part. An apparatus or a system including a processor is an apparatus or a system including these operation parts.

First Embodiment

This embodiment explains a method to efficiently create an eager zeroed thick virtual disk under a virtual environment employing thin-provisioning for a storage apparatus. In creating an eager zeroed thick virtual disk, upon receipt of a Write Same command, or a command for zero write (initialization), from a host computer, the storage apparatus inquires whether omission of zero write has been applied to the pages in the designated virtual storage area to a management computer.

The management computer determines whether to perform zero write. If the omission of zero write has not been applied, the storage apparatus performs the zero write as normal. If the omission of zero write has been applied, the storage apparatus does not perform the zero write but allocates prepared zero-written pages (pages initialized beforehand prior to the Write Same command).

Omitting time-consuming zero write leads to reducing the time for initialization responsive to the Write Same as well as eliminating second zero write (re-initialization) to the zero-written (initialized) pages. As a result, creating an eager zeroed thick virtual disk, which generally includes zero write, can reduce the time to be taken.

FIG. 1 illustrates a configuration example of physical connection of a virtual environment management network in this embodiment. The virtual environment management network includes a host computer 300 and storage apparatuses 100, which are connected to each other via a network connection apparatus 200 to exchange data with each other. The host computer 300 operates applications such as a configuration database and a file server using a server area network and a storage area network to input/output data to/from a storage area.

The storage apparatus 100 includes storage drives such as hard disk drives or SSDs (Solid State Drives) to provide real storage resources for storing data. The storage apparatus 100, the network connection apparatus 200, and the host computer 300 are connected to a storage management computer 500 via a management network 600. In this example, the management network 600 and a data input/output network configured with the network connection apparatus 200 are independent from each other but either one of them may function as the both.

Figure 2:
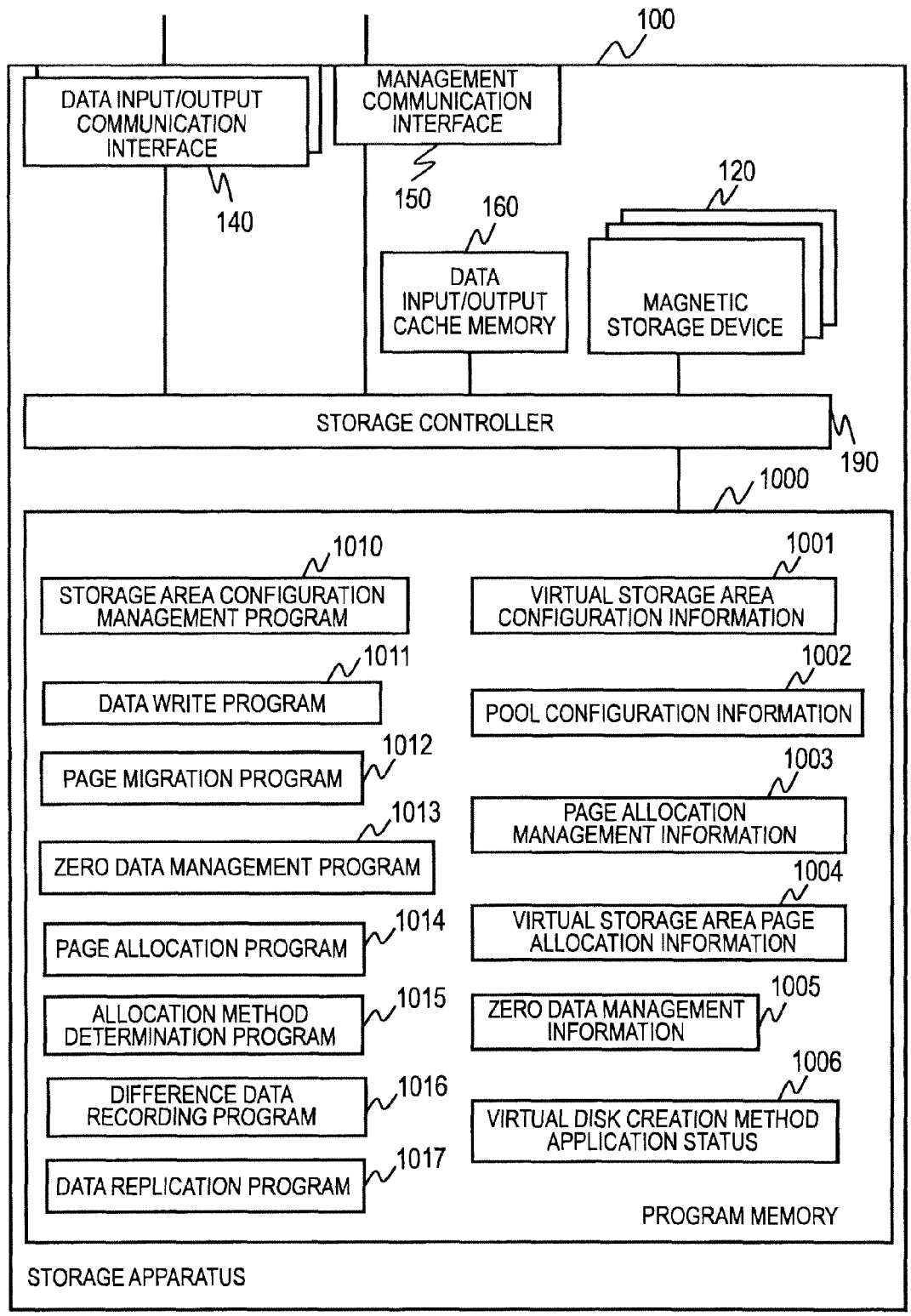
FIG. 2 is a drawing schematically illustrating a configuration of a storage apparatus in the first embodiment.

FIG. 2 illustrates a configuration example of the storage apparatus 100. The storage apparatus 100 includes a data input/output communication interface 140 for connecting to the network connection apparatus 200 and inputting/outputting data, a management communication interface 150 for connecting to the management network and inputting/outputting management information, and a storage controller 190 including a processor to manage control in the storage apparatus.

The storage apparatus 100 further includes a program memory 1000, which is a storage space for storing programs required for operation of the storage apparatus 100, a data input/output cache memory 160, which is a temporary storage area to enhance the speed of input/output from the host computer 300 to the storage area, and magnetic storage devices 120. These elements are connected to one another via the storage controller 190.

The data input/output communication interface 140 and the management communication interface 150 are implemented by a network input/output device employing a traditional communication technique such as Fibre Channel or Ethernet. This embodiment does not limit the number of the data input/output communication interfaces 140 and the management communication interfaces 150. The data input/output communication interface 140 does not need to be independent from the management communication interface 150 but can be shared for the purpose of inputting/outputting management information.

In typical, the data input/output cache memory 160 is implemented by a volatile memory, which may be substituted by a non-volatile memory or a magnetic storage device. This embodiment does not limit the number and the capacity of the data input/output cache memories 160.

The program memory 1000 is a memory space implemented by a magnetic storage device or a volatile semiconductor memory and is used to retain basic programs and information required for operation of the storage apparatus 100. The program memory 1000 retains a control program and control information for the storage apparatus 100.

Specifically, the program memory 1000 retains virtual storage area configuration information 1001, pool configuration information 1002, page allocation management in-formation 1003, virtual storage area page allocation information 1004, zero data management information 1005, and virtual disk creation method application status 1006. Details of the control information will be described later.

The program memory 1000 further retains a storage area configuration management program 1010, a data write program 1011, a page migration program 1012, a zero data management program 1013, a page allocation program 1014, an allocation method determination program 1015, a difference data recording program 1016, and a data replication program 1017.

The storage area configuration management program 1010 manages attributes of virtual storage areas 10 and storage area pools 12. In response to an instruction from the host, it defines an LU path for a virtual storage area 10. It also manages relations between virtual storage areas 10 and storage area pools 12 and between storage area pools 12 and logical storage areas 11.

The data write program 1011 writes data to a logical storage area 11 in response to a write instruction from the host. The page migration program 1012 performs migration of a file to a different virtual storage area 10 on a page basis upon receipt of an instruction for file migration from a host computer. The zero data management program 1013 manages whether zeros have been written to the pages in a logical storage area 11 in a storage area pool 12.

The page allocation program 1014 allocates a page of a logical storage area 11 in a storage area pool 12 to a page of a virtual storage area 10 or conversely deallocates an allocated page from a virtual storage area 10. Upon deallocation of a page, the data write program 1011 may write zeros to the page for management.

The allocation method determination program 1015 inquires whether to apply later-described zero write omission to the management computer 500 upon receipt of an instruction for allocation or zero write from a host computer in order to create a virtual disk.

The difference data recording program 1016 is a program for copying difference data. If the system is configured to perform writable-difference-data copy, it performs such copy. The data replication program 1017 retrieves data in a copy source logical storage area 11 and replicates the data to a copy destination logical storage area 11.

Figure 3:
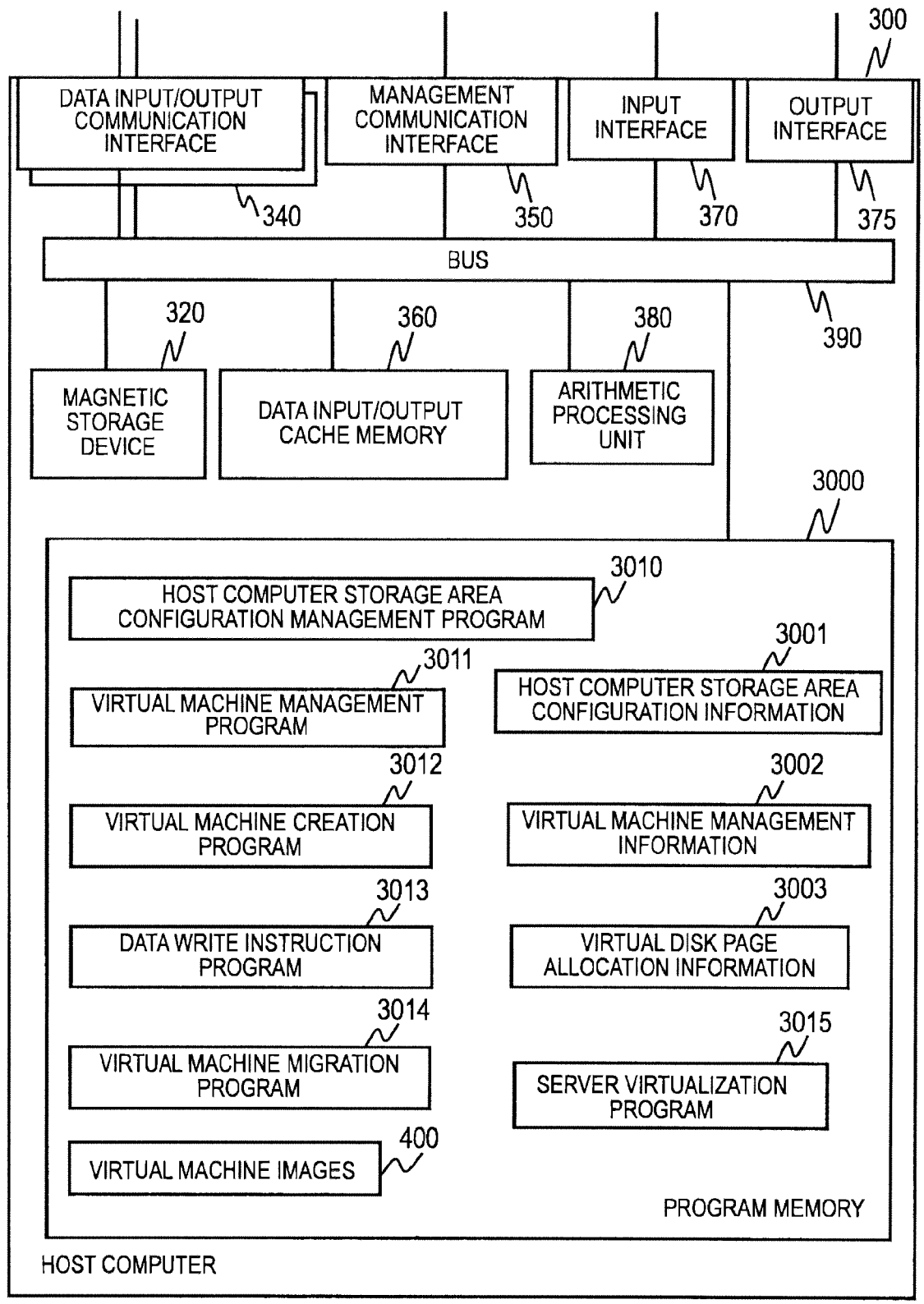
FIG. 3 is a drawing schematically illustrating a configuration of a host computer in the first embodiment.

FIG. 3 illustrates a configuration example of the host computer 300. The host computer 300 includes a data input/output communication interface 340 for connecting to the network connection apparatus 200 and inputting/outputting data, a management communication interface 350 for connecting to the management network and inputting/outputting management information, an input interface 370, such as a keyboard or a mouse, for an operator to input information, and an output interface 375, such as a general-purpose display, for outputting information to the operator.

The host computer 300 further includes an arithmetic processing unit 380 corresponding to a CPU for performing various calculations, a magnetic storage device 320 for storing basic software such as an operating system and applications, a program memory 3000, which is a storage space for storing programs required for operation of the host computer 300, and a data input/output cache memory 360, which is implemented by a volatile memory to enhance the speed of data input/output.

The elements in the host computer 300 are connected to one another via a communication bus 390. The hardware configuration of the host computer 300 in this example can be provided by a general-purpose computer.

The data input/output communication interface 340 and the management communication interface 350 are implemented by a network input/output device employing a traditional communication technique such as Fibre Channel or Ethernet. This embodiment does not limit the number of the data input/output communication interfaces 340 and the management communication interfaces 350.

The data input/output communication interface 340 does not need to be independent from the management communication interface 350 and can be shared for the purpose of inputting/outputting management information. In typical, the data input/output cache memory 360 is implemented by a volatile memory, which may be substituted by a non-volatile memory or a magnetic storage device. This invention does not limit the number and the capacity of the data input/output cache memories 360.

The program memory 3000 is a memory space implemented by a magnetic storage device or a volatile semiconductor memory and is used to retain basic programs and information required for operation of the host computer 300. Specifically, the program memory 3000 retains host computer storage area configuration information 3001, virtual machine management information 3002, and virtual disk page allocation information 3003. Details of the control information will be described later.

The program memory 3000 further retains a host computer storage area configuration management program 3010, a virtual machine management program 3011, a virtual machine creation program 3012, a data write instruction program 3013, a virtual machine migration program 3014, a server virtualization program 3015, and virtual machines 400.

The host computer storage area configuration management program 3010 manages path configuration between storage volumes 13 and virtual storage areas 10. The virtual machine management program 3011 manages the virtual machines 400 and the configuration information on the virtual machines 400 in the host computer 300. This program carries out transmission of information to a virtual environment management computer and update of the host computer storage area configuration management information 3001 and the virtual machine management information 3002 in creating or deleting a virtual machine 400.

Upon receipt of a request to create a virtual machine 400 from the management computer 500, the virtual machine creation program 3012 virtualizes the data input/output cache memory 360 and the arithmetic processing unit 380 to create a virtual machine 400 in the internal magnetic storage device 320 or a virtual storage area 10 in the external storage apparatus 100. In addition to creating a virtual machine 400, this program allocates a new storage area 420 to the created virtual machine 400 in response to a request of the management computer 500 to create a virtual disk 14.

The data write instruction program 3013 issues an instruction for a data write to a page 16 in a virtual storage area 10 in the storage apparatus 100 while designating the corresponding page 17 in the storage volume 13.

The virtual machine migration program 3014 performs migration of a virtual machine image 400 to a different storage volume 13. It performs migration not only on a virtual machine 400 basis but also on a virtual disk 14 basis, if the virtual machine 400 includes a plurality of virtual disks 14.

The server virtualization program 3015 virtualizes resources in the host computer 300, such as the magnetic storage device 320, the data input/output cache memory 360, and the arithmetic processing unit 380. There are two types for this program: a hypervisor-type operating system and a workstation-type operating system that configures a virtual environment on a normal operating system. The virtual machine images 400 will be described later.

Figure 4:
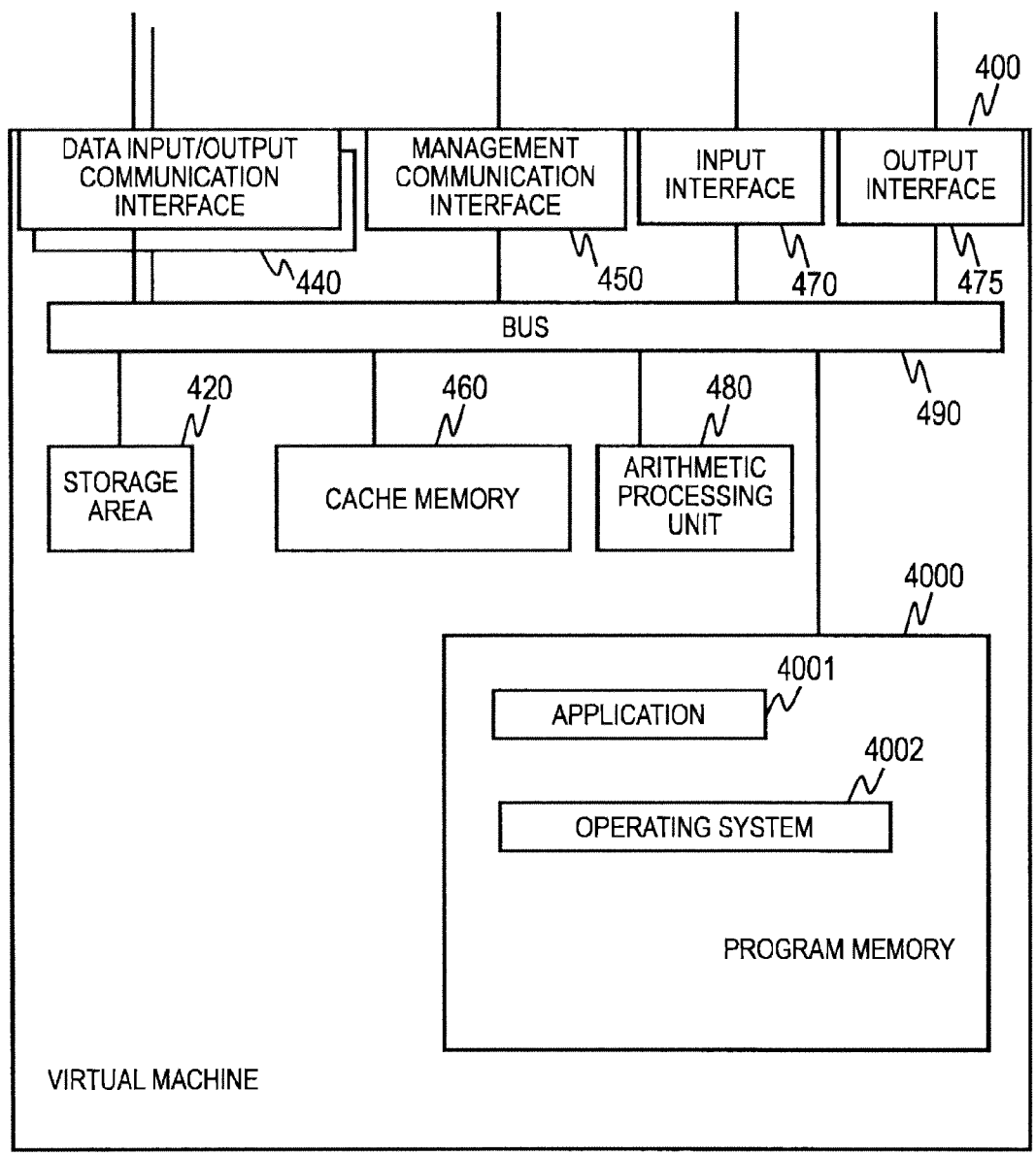
FIG. 4 is a drawing schematically illustrating a configuration of a virtual machine in the first embodiment.

FIG. 4 illustrates a configuration example of a virtual machine 400. The virtual machine 400 created on the host computer 300 is allocated the physical memory 360 and the arithmetic processing unit 380 in the host computer 300 which have been virtualized and has an equivalent configuration as the host computer 300.

The virtual machine 400 includes a management communication interface 450 for connecting to the management network 600 and inputting/outputting management information, an input interface 470, such as a keyboard or a mouse, for an operator to input information, and an output interface 475, such as a general-purpose display, for outputting information to the operator.

The virtual machine 400 further includes an arithmetic processing unit 480 corresponding to a CPU for performing various calculations, a storage area 420 for storing basic software such as an operating system 4002 and applications 4001, a program memory 4000, which is a storage space for storing programs required for operation of the virtual machine 400. The elements of the virtual machine 400 are connected to one another via a communication bus 490.

The program memory 4000 is a memory space implemented by a magnetic storage device or a volatile semiconductor memory and retains applications and the operating system. It should be noted that the elements 420, 440, 450, 460, 470, 475, 480, 490, and 4000 in the virtual machine 400 are all virtual.

Figure 5:
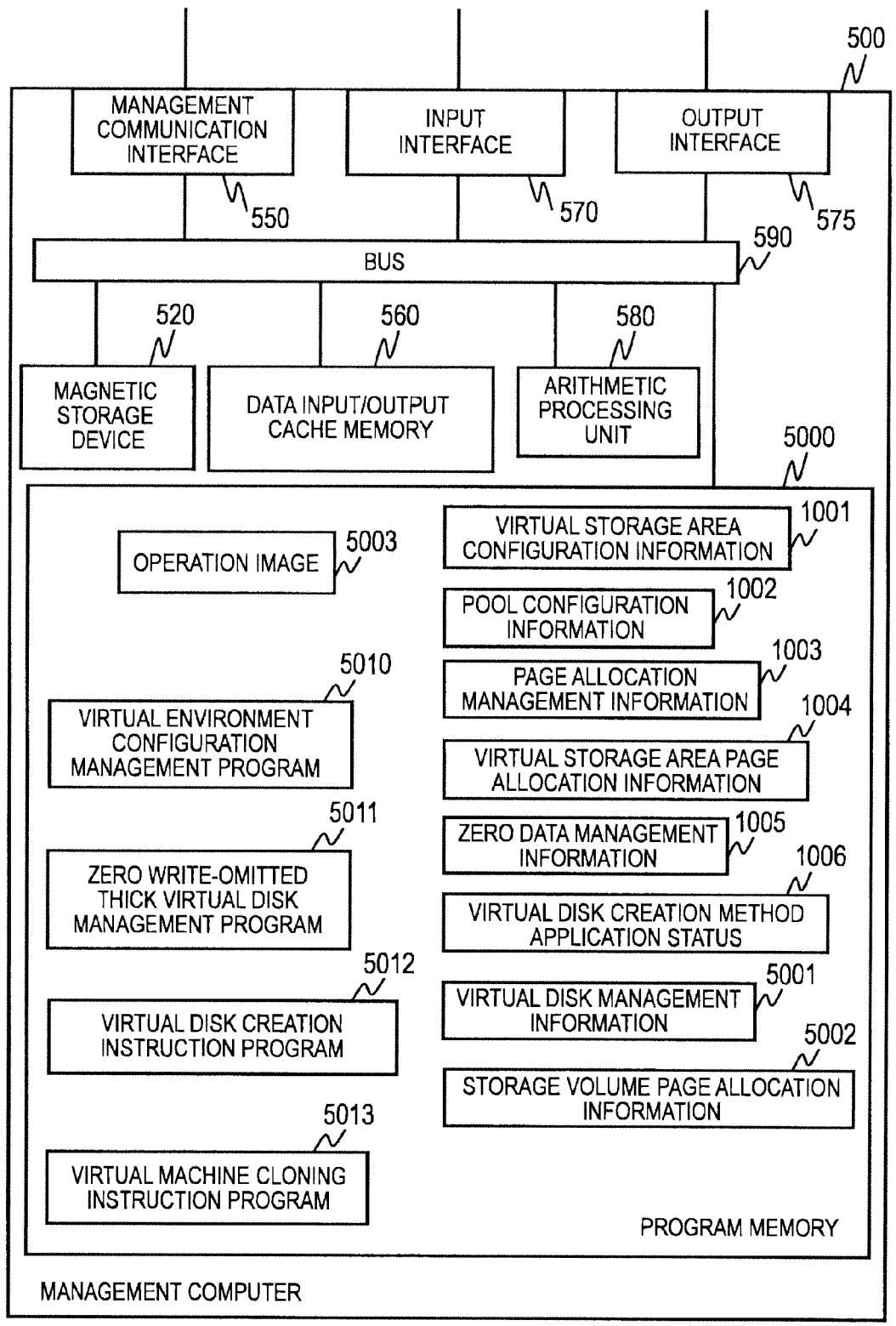
FIG. 5 is a drawing schematically illustrating a configuration of a management computer in the first embodiment.

FIG. 5 illustrates a configuration example of the management computer 500. The management computer 500 has configuration information on the storage apparatus 100 and the host computer 300 and, in addition, programs to instruct the storage apparatus 100 or the host computer 300 to perform processing.

The management computer 500 includes a management communication interface 550 for connecting to the management network 600 and inputting/outputting management information, an input interface 570, such as a keyboard or a mouse, for an operator to input information, and an output interface 575, such as a general-purpose display, for outputting information to the operator.

The management computer 500 further includes an arithmetic processing unit 580 corresponding to a CPU for performing various calculations, a magnetic storage device 520 for storing basic software such as an operating system and applications, a program memory 5000, which is a storage space for storing programs required for operation of the management computer 500. The elements of the management computer 500 are connected to one another via a communication bus 590. The hardware configuration of the management computer 500 in this example can be provided by a general-purpose computer (PC).

The program memory 5000 is a memory space implemented by a magnetic storage device or a volatile semiconductor memory and is used to retain basic programs or information required for operation of the management computer 500. Specifically, the program memory 5000 retains virtual storage area configuration information 1001, pool configuration information 1002, page allocation management information 1003, virtual storage area page allocation information 1004, zero data management information 1005, virtual disk creation method application status 1006, virtual disk management information 5001, storage volume page allocation information 5002, and an operation image 5003. Details of the control information and the operation image will be described later.

The program memory 5000 further retains a virtual environment configuration management program 5010, a zero write omitted thick virtual disk management program 5011, a virtual disk creation instruction program 5012, and a virtual machine cloning instruction program 5013.

The virtual environment configuration management program 5010 periodically acquires configuration information from the storage apparatus 100 and the host computer 300 to manage the thin/thick type of virtual disks 14 in the virtual machines 400 and correspondence relations between pages 17 in storage volumes 13 holding the virtual disks 14 and pages 16 in virtual storage areas 10.

The zero write-omitted thick virtual disk management program 5011 determines whether to apply zero write omission and sends a result of the determination in response to an inquiry from the storage apparatus 100. The virtual disk creation instruction program 5012 instructs a host computer 300 to create a virtual disk upon receipt of a request to create a virtual disk through the input interface 570.

The virtual machine cloning instruction program 5013 instructs the storage apparatus 100 and the host computer 300 to obtain snapshots or full copies on a virtual storage area basis and create the requested number of virtual machines upon receipt of a request to create virtual machines through the input interface 570.

FIG. 6 is a configuration example of the virtual storage area configuration information 1001 retained in the storage apparatus 100. In each entry, a storage area pool 12 (refer to FIG. 18) recorded in pool identification information 10013 is related to a virtual storage area 10 (refer to FIG. 18) recorded in virtual storage area identification information 10012, which is provided to a data input/output communication interface 140 recorded in communication interface identification information 10011.

The virtual storage area 10 is a unit of storage resource accessible from the host computer 300 connected to the storage apparatus 100 and corresponds to a volume mounted to a file system operated by the host computer 300.

FIG. 7 is a configuration example of the pool configuration information 1002 retained in the storage apparatus 100. This control information indicates correspondence relations between storage area pools 12 and logical storage areas 11 (refer to FIG. 18) that constitute the pools. The storage area pools 12 recorded in pool identification information 10021 are aggregations of storage areas, each composed of the logical storage areas 11 recorded in logical storage area identification information 10022.

Figure 8:
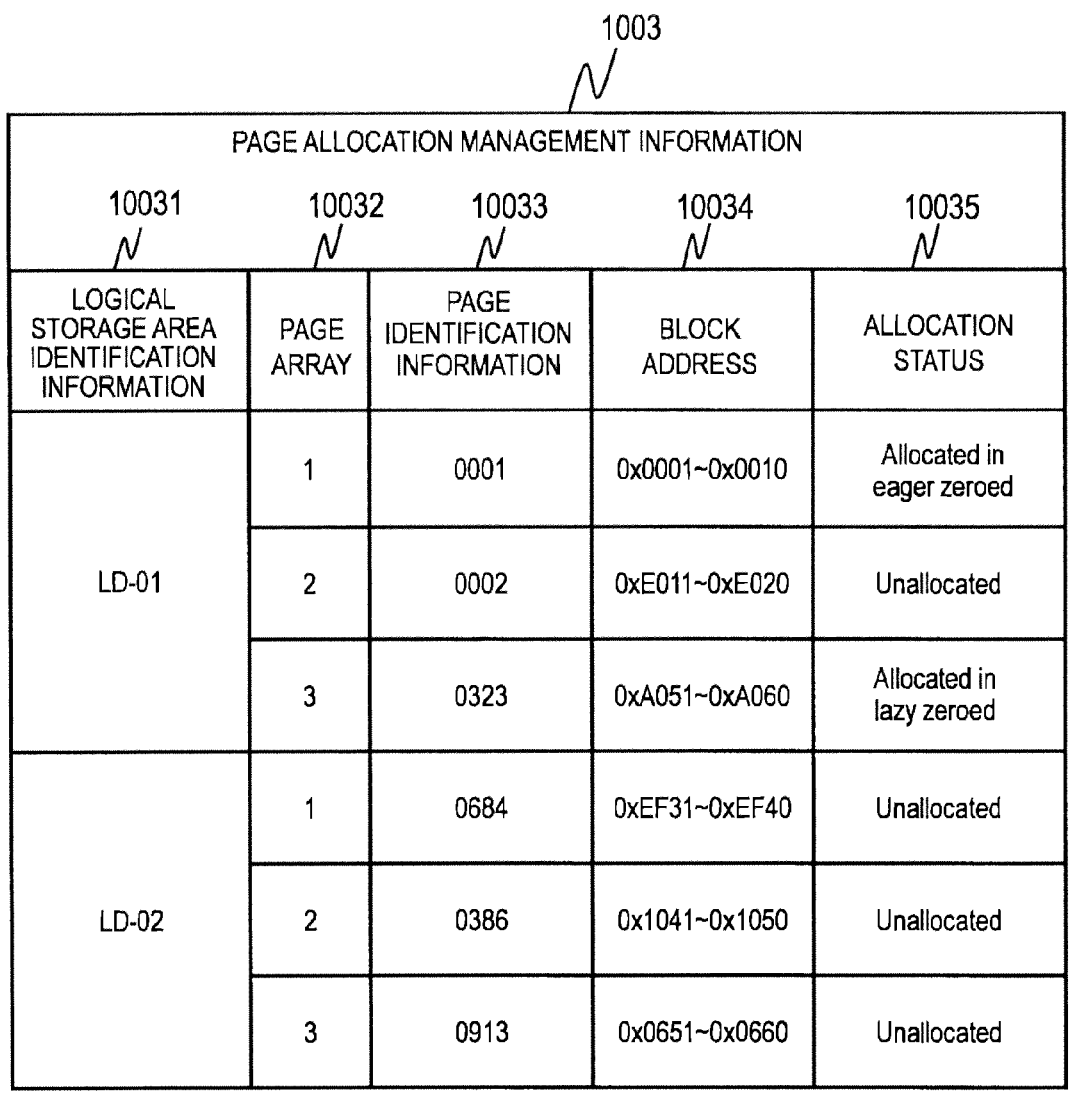
FIG. 8 is a drawing illustrating a configuration example of page allocation management information in the first embodiment.

FIG. 8 is a configuration example of the page allocation management information 1003 retained in the storage apparatus 100. This control information manages the block address of each page 15 in the logical storage areas 11 (refer to FIG. 18) and in which format the page has been allocated to a page 16 in a virtual storage area 10 (refer to FIG. 18). A page 15 recorded in page identification information 10033 is disposed in the logical storage area 11 recorded in logical storage area identification information 10031 as indicated in page array 10032 and is located at the block address range recorded in block address 10034.

The allocation status 10035 indicates the allocation statuses of pages to virtual storage areas 10. "Allocated in eager zeroed" indicates that the page has been allocated to a virtual storage area in the eager zeroed thick format and "Allocated in lazy zeroed" indicates in the lazy zeroed thick format. "Unallocated" indicates that the page has not been allocated to any virtual storage area.

FIG. 9 is a configuration example of the virtual storage area page allocation information 1004 retained in the storage apparatus 100. This control information indicates whether any page 15 in any logical storage area 11 has been allocated to each page 16 in the virtual storage areas 10. In virtual storage area information 10041, virtual storage area identification information 10043, page array 10044, page identification information 10045, and allocation status 10046 regarding virtual storage areas 10 are recorded. In logical storage area identification information 10042, logical storage area identification information 10047 and page array 10048 regarding logical storage areas 11 are recorded.

In a virtual storage area 10 recorded in the virtual storage area identification information 10043, a page 16 is disposed in the array as recorded in the page array 10044 and uniquely identified with the identification information recorded in the page identification information 10045. The allocation status 10046 indicates whether the page 16 has been allocated to a page 17 (refer to FIG. 18) in a storage volume 13 (refer to FIG. 18). If it has been allocated, "Allocated" is recorded, and if not, "Null" is recorded.

The page 16 is allocated a page 15 in a logical storage area 11 recorded in logical storage area identification information 10047. This page 15 is disposed in the logical storage area 11 in the array as recorded in the page array 10048. If the page 15 in the logical storage area 11 has not been allocated to the page 16 in the virtual storage area 10, "Null" is recorded in the logical storage area identification information 10047 and the page array 10048.

FIG. 10 is a configuration example of the zero data management information 1005 retained in the storage apparatus 100. This control information indicates whether zeros have been written to each page in logical storage areas 11. In page identification information 10052, identification information on the pages 15 is recorded for each logical storage area 11 recorded in logical storage area identification information 10051. In zero write status 10053, text of "zero" or "not zero" is recorded to indicate whether the data in the particular page is zero.

For example, when the data write program 1011 performs a zero write in response to a Write Same command sent from the host computer 300 or when data in a page is deleted and a zero write is performed, the zero data management program 10013 changes the status from "not zero" to "zero". Conversely, when the data write program 1011 receives a write instruction other than the Write Same command from the host computer 300, the zero data management program 10013 changes the status from "zero" to "not zero".

FIG. 11 is a configuration example of the virtual disk creation method application status 1006 retained in the storage apparatus 100. This control information manages the application status of zero write omission on each page 16 identified with virtual storage area identification information 10061 and page identification information 10062. This information is referred to by the storage apparatus 100 to determine whether omission of zero write has been applied in the later-described second embodiment. Since a value in the zero write omission application status 10063 is changed to "Applied" in accordance with an instruction from the management computer 500, the initial value may be "Not applied".

Figure 12:
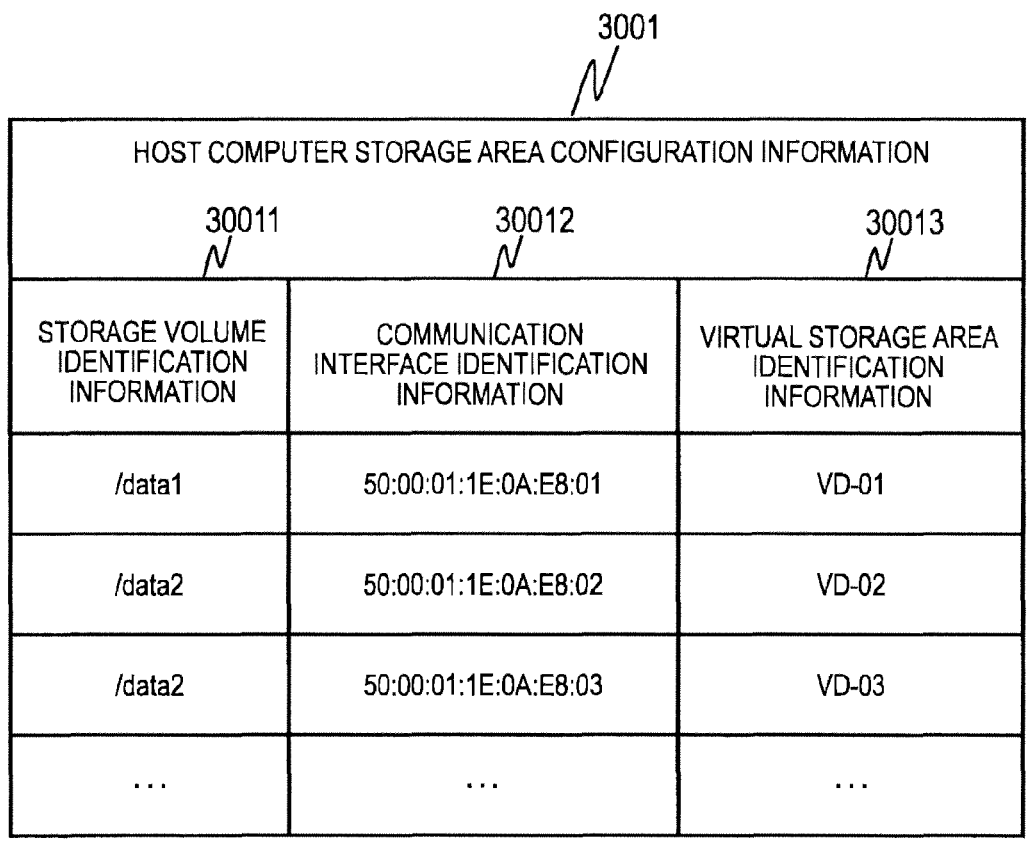
FIG. 12 is a drawing illustrating a configuration example of host computer storage area configuration information in the first embodiment.

FIG. 12 is a configuration example of the host computer storage area configuration information 3001 retained in the host computer 300. To operate a file system in the host computer 300, the host computer 300 mounts a storage device to a storage volume 13 recorded in the storage volume identification information 30011. The storage volume 13 corresponds to the virtual storage area 10 recorded in virtual storage area identification information 30013, which is provided to the data input/output communication interface 140 recorded in communication interface identification information 30012.

Accordingly, an input/output request to a storage volume 13 recorded in the storage volume identification information 30011 is executed on the virtual storage area 10 provided to the data input/output communication interface 140 in the storage apparatus 100 to which the storage volume can connect via the data input/output network 300.

Figure 13:
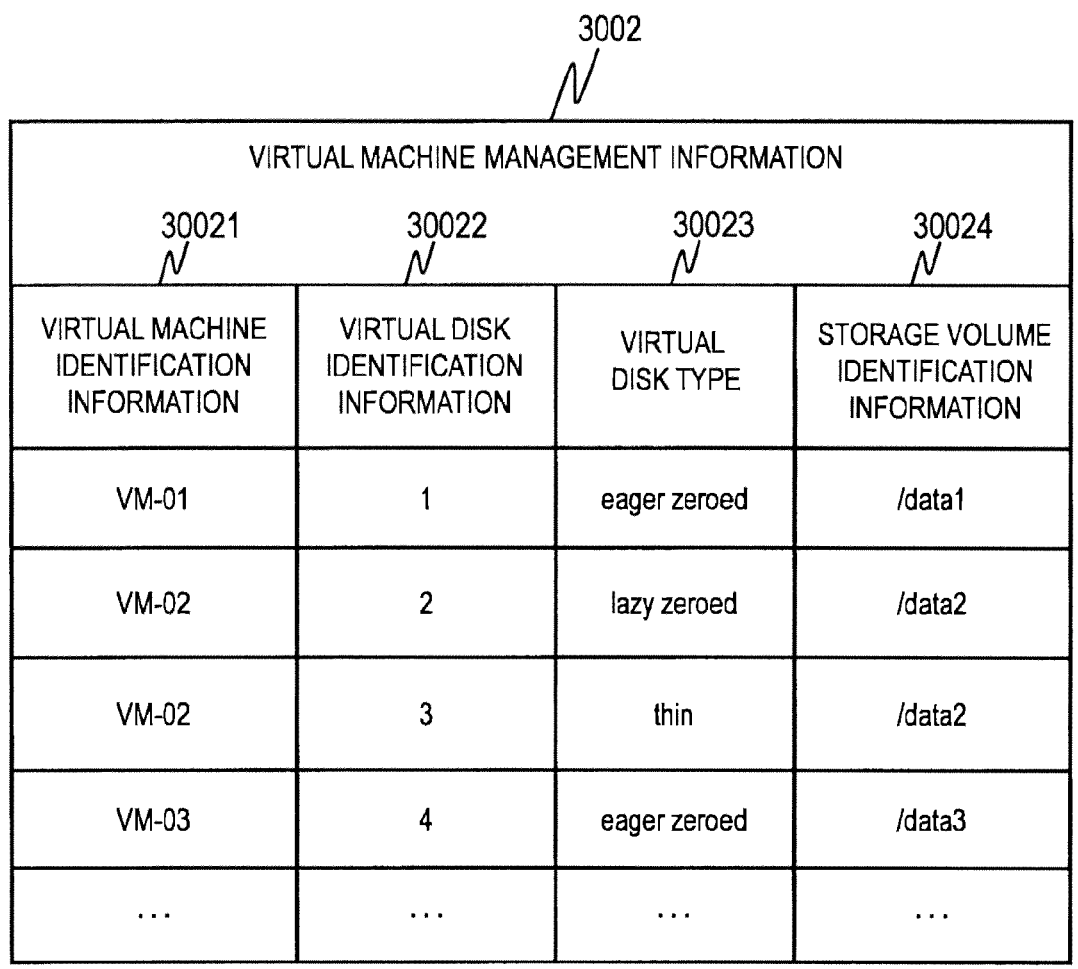
FIG. 13 is a drawing illustrating a configuration example of virtual machine management information in the first embodiment.

FIG. 13 is a configuration example of the virtual machine management information 3002. This control information indicates information on each virtual disk 14 (refer to FIG. 18) in each virtual machine 400 and information on the storage area in the host computer 300 holding the virtual disk 14.

A virtual machine 400 recorded in virtual machine identification information 30021 has a virtual disk 14 recorded in virtual disk identification information 30022; the virtual disk 14 is the type recorded in virtual disk type 30023. In the virtual disk type 30023, any one of "eager zeroed", "lazy zeroed", and "thin" is recorded. The virtual disk 14 is stored in the storage volume 13 recorded in virtual volume identification information 30024.

Figure 14:
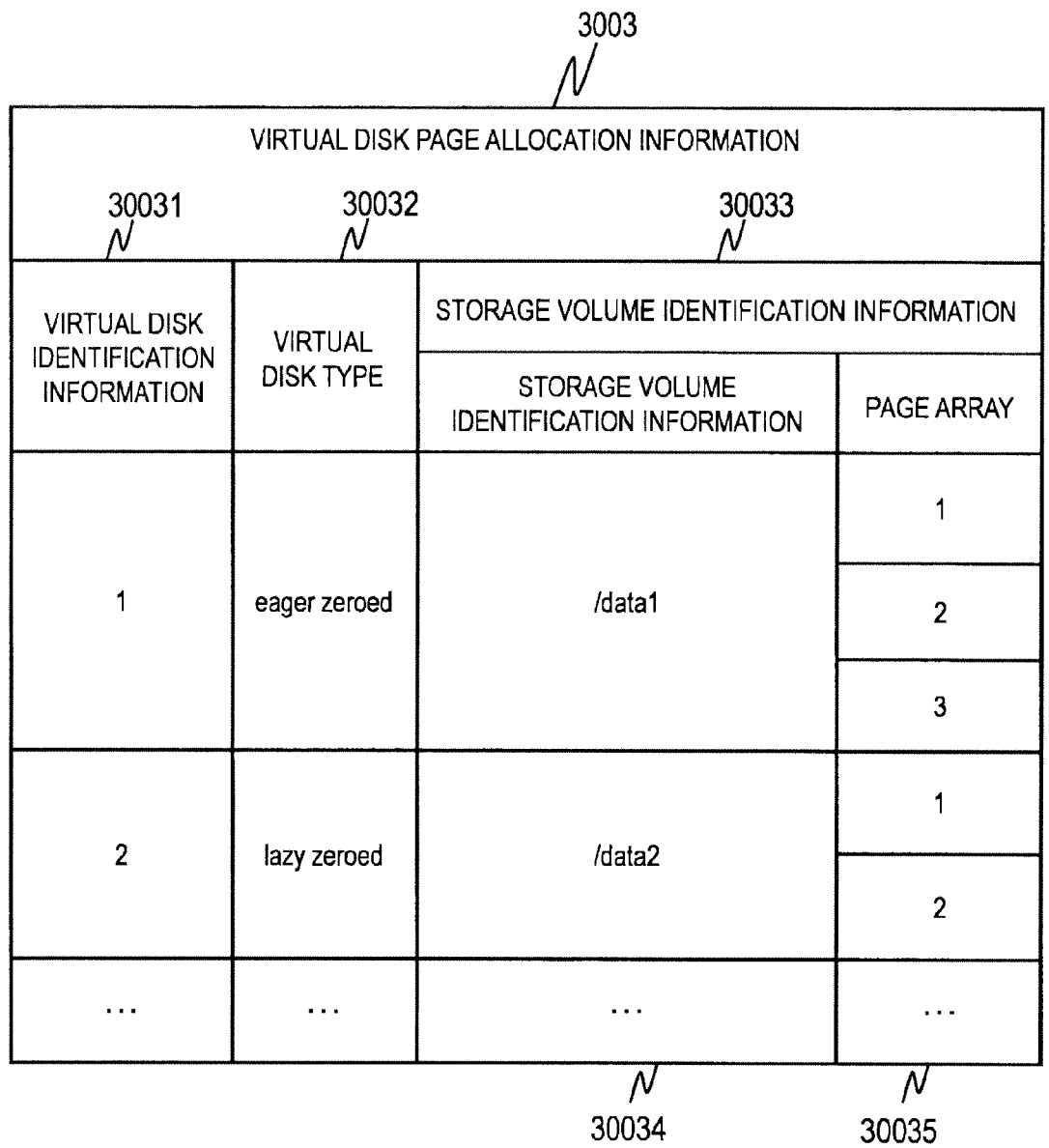
FIG. 14 is a drawing illustrating a configuration example of virtual disk page allocation information in the first embodiment.

FIG. 14 is a configuration example of the virtual disk page allocation information 3003 retained in the host computer 300. This control information indicates each virtual disk 14 and the pages 17 of the storage volume 13 allocated to the virtual disk.

Storage volume identification information 30034 and page array 30035 about a storage volume 13 are recorded in storage volume identification information 30033. A virtual disk 14 recorded in virtual disk identification information 30031 is categorized as the category recorded in virtual disk category 30032 and uses the pages 17 recorded in the page array 30035 for the storage volume 13 recorded in the storage volume identification information 30034.

Figure 15:
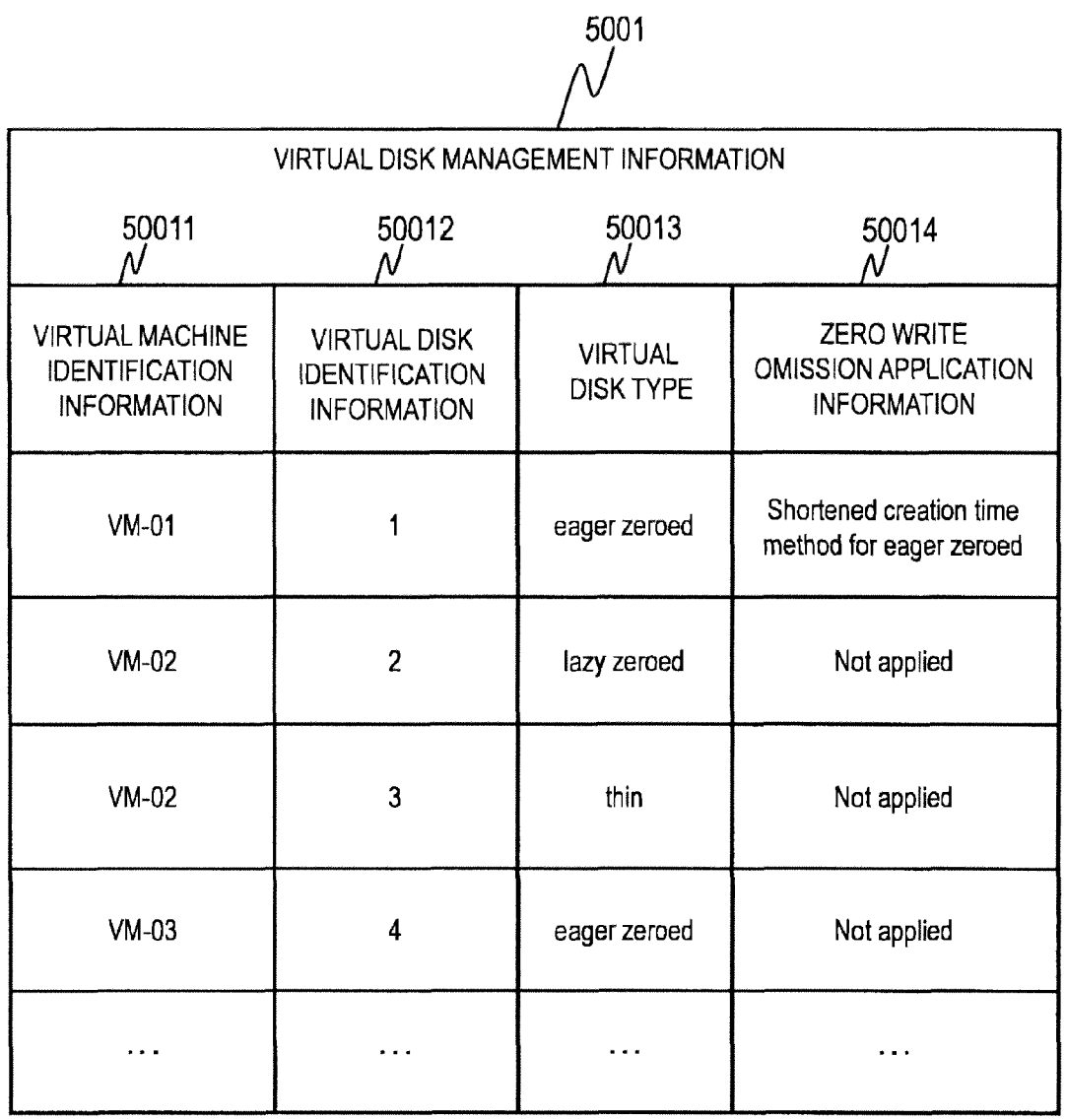
FIG. 15 is a drawing illustrating a configuration example of virtual disk management information in the first embodiment.

FIG. 15 is a configuration example of the virtual disk management information 5001 retained in the management computer 500. This control information manages the type and creation method of each virtual disk 14. A virtual machine 400 uniquely identified with virtual machine identification information 50011 has a virtual disk 14 uniquely identified with virtual disk identification information 50012; this virtual disk 14 is the type as recorded in virtual disk type 50013. In zero write omission application information 50014, whether zero write omission has been applied is recorded.

FIG. 16 is a configuration example of the storage volume page allocation information 5002 retained in the management computer 500. This control information indicates pages 17 in each storage volume 13 allocated to each virtual disk 14 and the pages 16 in virtual storage areas 10 in the storage apparatus 100 allocated to these pages 17.

Storage volume identification information 50025 and page array 50026 about a storage volume 13 are recorded in storage volume information 50023. Virtual storage area identification information 50027 and page array 50028 about a virtual storage area 10 are recorded in virtual storage area information 50024.

A virtual machine 400 uniquely identified with virtual machine identification information 50021 has a virtual disk 14 recorded in virtual disk identification information 50022. This virtual disk 14 is allocated pages 17 which are in the storage volume 13 recorded in the storage volume identification information 50025 and disposed as indicated in the page array 50026. Each of these pages 17 is allocated a page 16 which is in the virtual storage area 10 recorded in the virtual storage area identification information 50027 and is disposed as indicated in the page array 50018.

Figure 17:
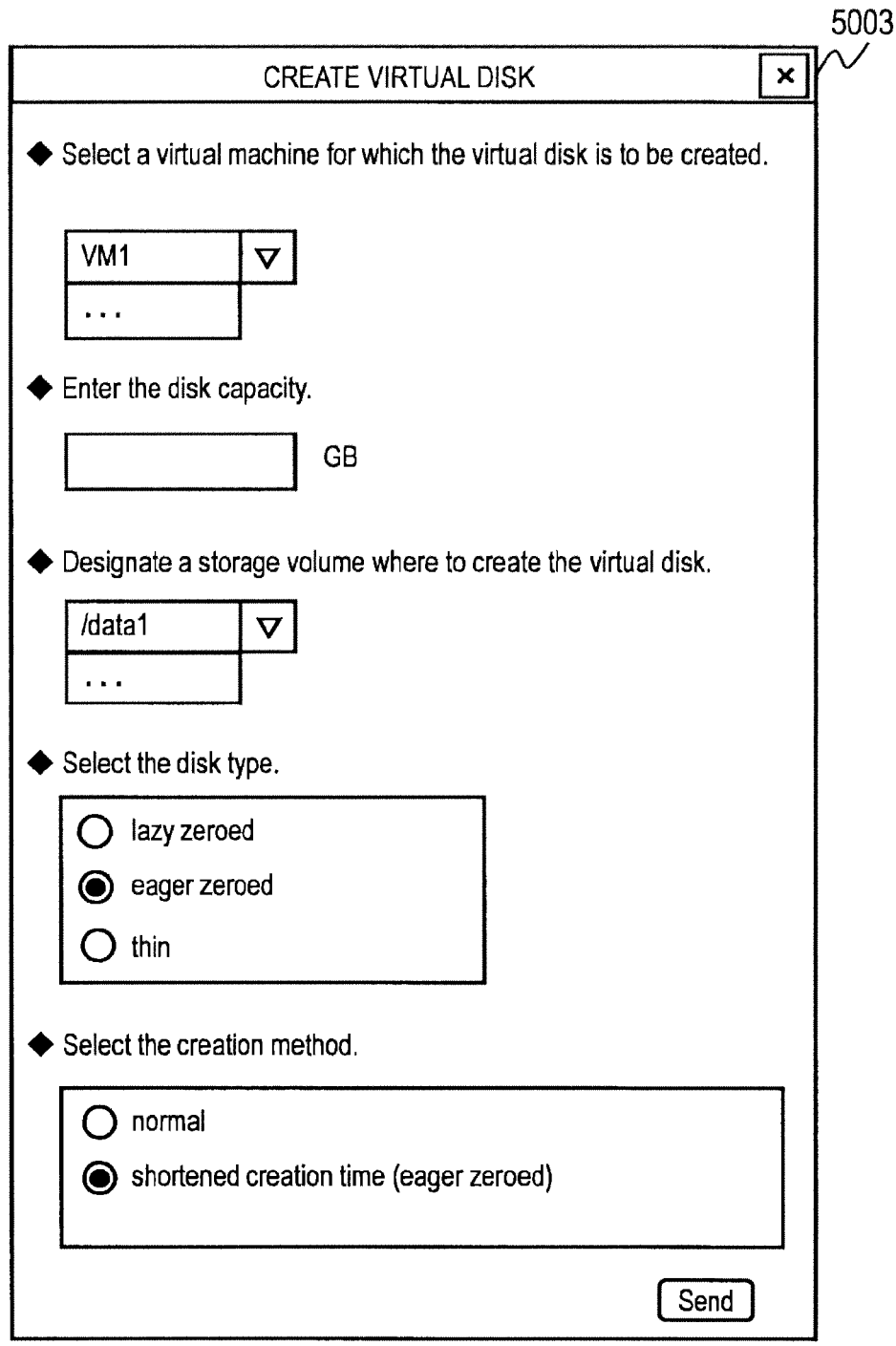
FIG. 17 is a drawing illustrating a configuration example of an operation image in the first embodiment.

FIG. 17 is a configuration example of the operation image 5003 retained in the management computer 500. The administrator can create a virtual disk 14 with a screen displaying this image. The administrator creates a virtual disk 14, specifying the virtual machine 400 for which the virtual disk 14 is to be created, the capacity of the virtual disk 14, the storage volume 13 where to create the virtual disk 14, the disk type (one of "lazy zeroed", "eager zeroed", and "thin"), and the creation method.

The creation method of a virtual disk may be configured in such a way that only the method appropriate for the type of the disk can be selected; for example, if eager zeroed thick is selected, either one of "normal method" and "shortened creation time method" can be selected, and if lazy zeroed thick is selected, only "normal method" can be selected as the present technique is not applied. When the administrator clicks "Send" on this image, creation of a thick virtual disk starts. The creation will be described later with reference to FIGS. 21 and 22. Provided here is an example of creating a new virtual disk 14 in an existing virtual machine 400 but may be a part of creating a virtual machine 400.

Figure 18:
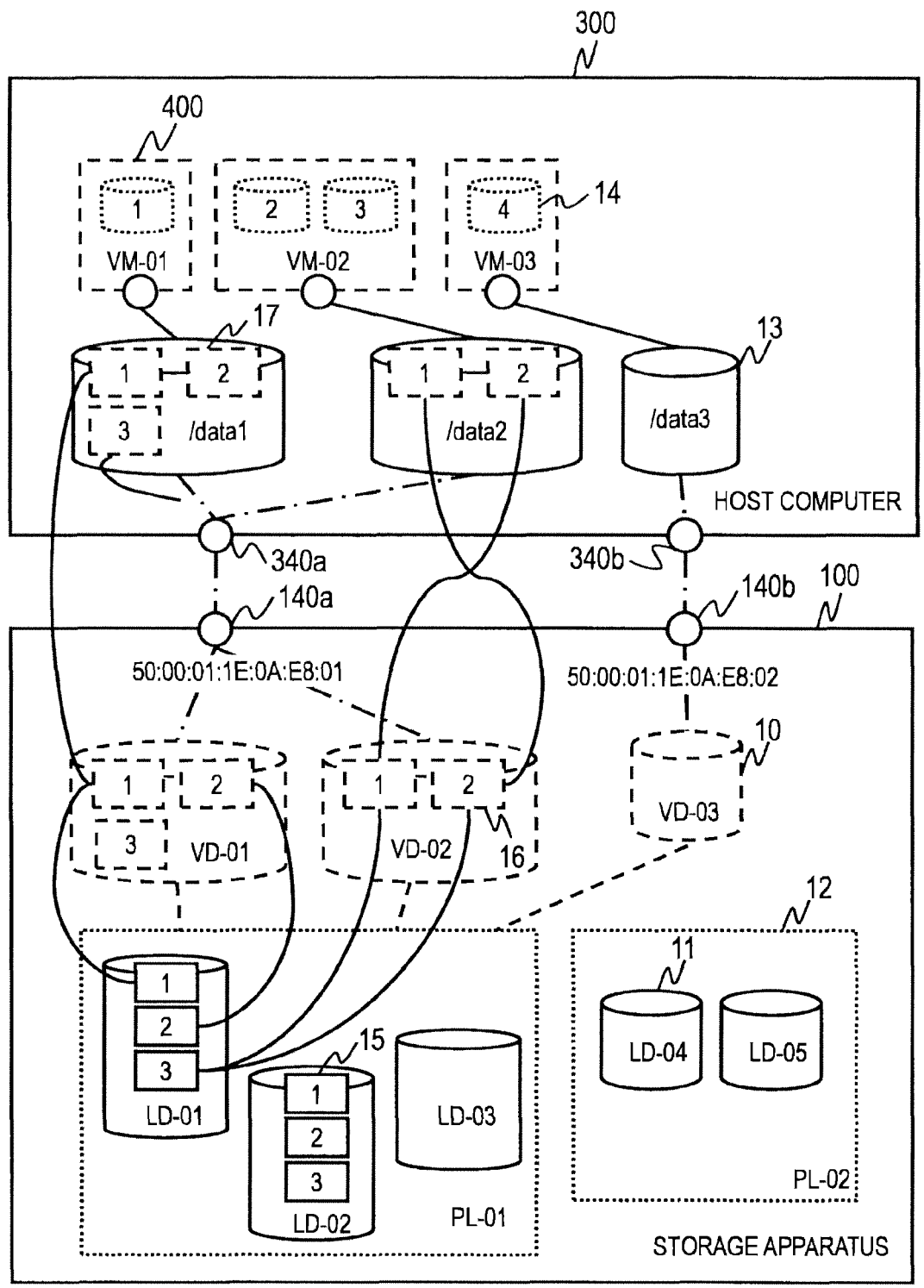
FIG. 18 is a drawing illustrating a configuration example of page allocation in the first embodiment.

FIG. 18 depicts a configuration example of the host computer 300 and the storage apparatus 100 exemplified by FIGS. 6 to 9, FIGS. 12 to 14, and FIG. 16 in a form of a logical diagram. In the storage apparatus 100, a plurality of logical storage areas 11 constitute a storage area pool 12. For example, in a storage area pool PL-01, logical storage areas LD-01, LD-02, and LD-03 are defined.

A storage area pool 12 allocates areas on a page basis to a virtual storage area 10 tied to the pool. For example, virtual storage areas VD-01, VD-02, and VD-03 correspond to the storage area pool PL01; a page 1 in the logical storage area LD-01 in the storage area pool PL01 is allocated to a page 1 in the virtual storage area VD-01.

Allocation of a page 15 in a logical storage area 11 to a page 16 in a virtual storage area 10 may be virtual one. For example, a page 3 in the logical storage area LD-01 is doubly related to pages 1 and 2 in the virtual storage area VD-02 and is not allocated physically.

Furthermore, a virtual storage area 10 is related to a host computer storage volume 13 in the host computer 300. The virtual storage area 10 is allocated to the storage volume 13 tied to the virtual storage area 10 on a page basis. For example, the virtual storage area VD01 for the data I/O communication I/F 50:00:01:1E:0A:E8:01 corresponds to a storage volume /data1 and a page 1 in the virtual storage area VD01 is allocated to a page 1 of the storage volume /data1.

A virtual machine 400 is created on a storage volume 13. For example, a virtual machine VM-01 is configured on a host computer storage volume /data1. As illustrated in the configuration example of FIG. 18, the storage apparatus 100 provides real storage resources and virtual storage resources. The virtual storage areas 10 and the pages 16 therein are virtual storage resources; the logical storage areas 11, the pages 15 therein, and the storage area pools 12 are real storage resources.

Figure 19:
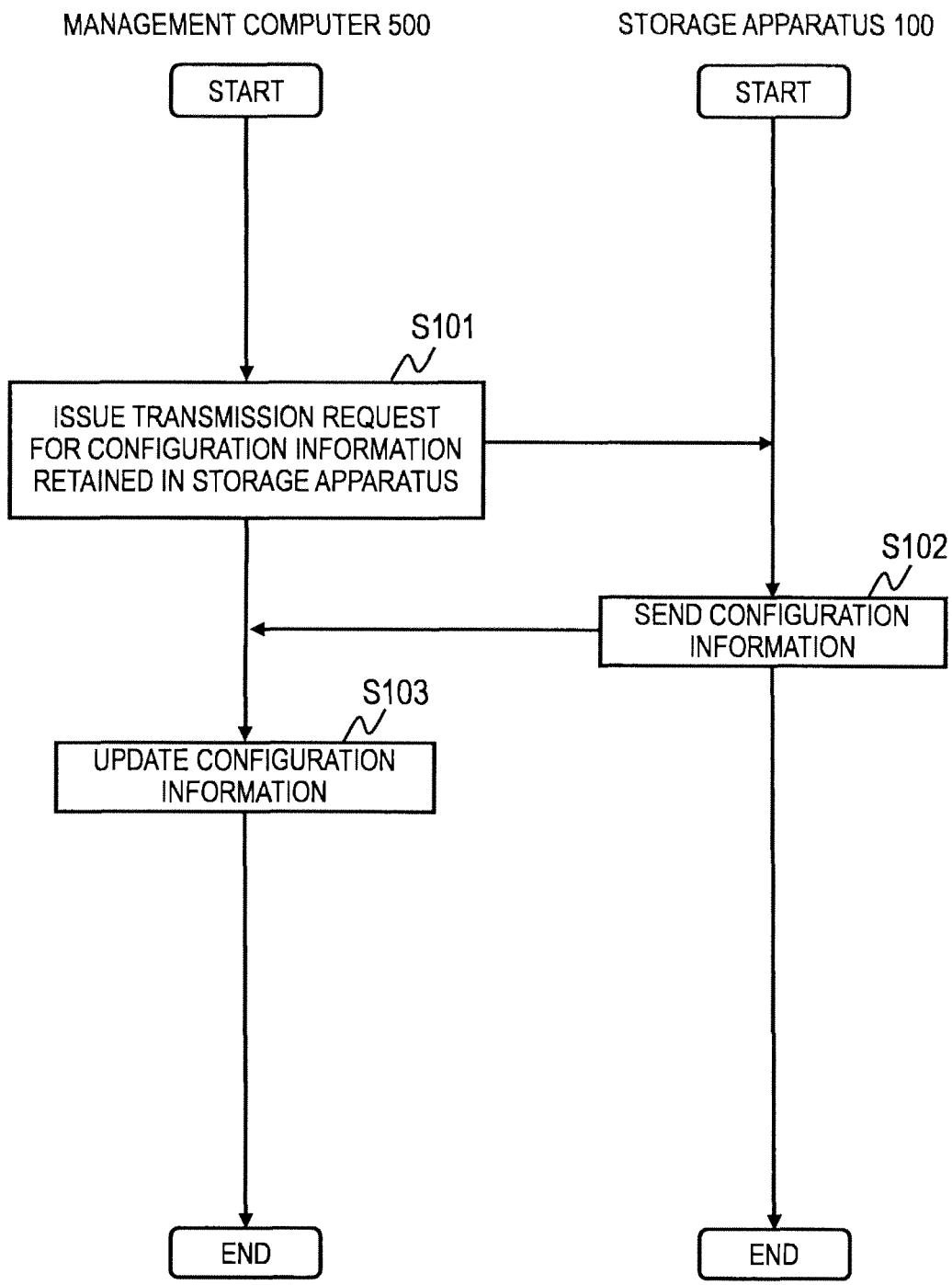
FIG. 19 is a flowchart illustrating an example of a procedure for updating storage configuration information in the first embodiment.

FIG. 19 illustrates a procedure for updating control information 1001 to 1006 and storage volume page allocation information 5002 retained in the program memory 5000 in the management computer 500 in the form of a flowchart. The virtual environment configuration management program 5010 in the management computer 500 updates the control information 1001 to 1006 and the virtual storage area information 50024 in the storage volume page allocation information 5002 retained in the program memory 5000 to the latest information as needed.

Hereinafter, all processing in the management computer 500 is executed by the arithmetic processing unit 580. All processing in the storage apparatus 100 is executed by the storage controller 190. The same applies to the other flows.

As illustrated in FIG. 19, the virtual environment configuration management program 5010 in the management computer 500 issues a request message to the storage apparatus 100 for all control information 1001 to 1006 in the storage apparatus 100 (step S101). The storage area configuration management program 1010 in the storage apparatus 100 that has received the transmission request from the management computer 500 sends the control information 1001 to 1006 held in the storage apparatus 100 to the management computer 500 (step S102).

The virtual environment configuration management program 5010 that has received the control information from the storage apparatus 100 updates the control information 1001 to 1006 and the storage volume page allocation information 5002 retained in the program memory 5000 (step S103).

Figure 20:
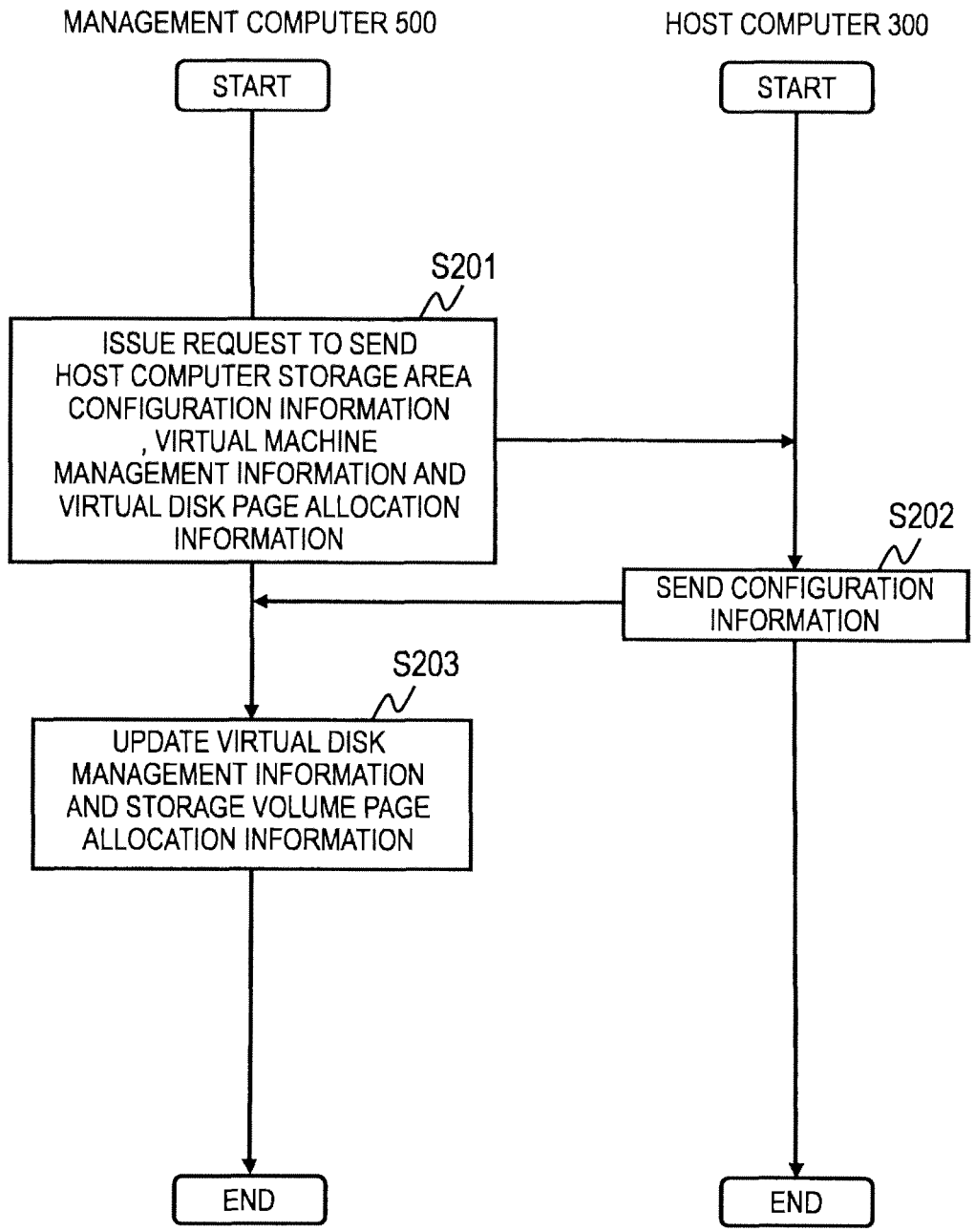
FIG. 20 is a flowchart illustrating an example of a procedure for updating host computer configuration information in the first embodiment.

FIG. 20 illustrates a procedure for updating the virtual disk management information 5001 and the storage volume page allocation information 5002 retained in the program memory 5000 in the management computer 500 in the form of a flowchart. The virtual environment configuration management program 5010 in the management computer 500 updates the virtual disk management information 5001 and the storage volume page allocation information 5002 retained in the program memory 5000 to the latest information as needed.

As illustrated in FIG. 20, the virtual environment configuration management program 5010 issues a request message to the host computer 300 for all control information 3001 to 3003 held in the host computer 300 (step S201).

All processing in the host computer 300 is executed by the arithmetic processing unit 380. Upon receipt of the transmission request for the host computer storage area configuration information 3001, the virtual machine management information 3002, and the virtual disk page allocation information 3003, the virtual machine management program 3011 in the host computer 300 sends all control information 3001 to 3003 in accordance with the request (step S202).

Upon receipt of all the control information 3001 to 3003 held in the host computer 300, the virtual environment configuration management program 5010 updates the virtual disk management information 5001 and the storage volume page allocation information 5002 retained in the program memory 5000 (step S203).

Figure 21:
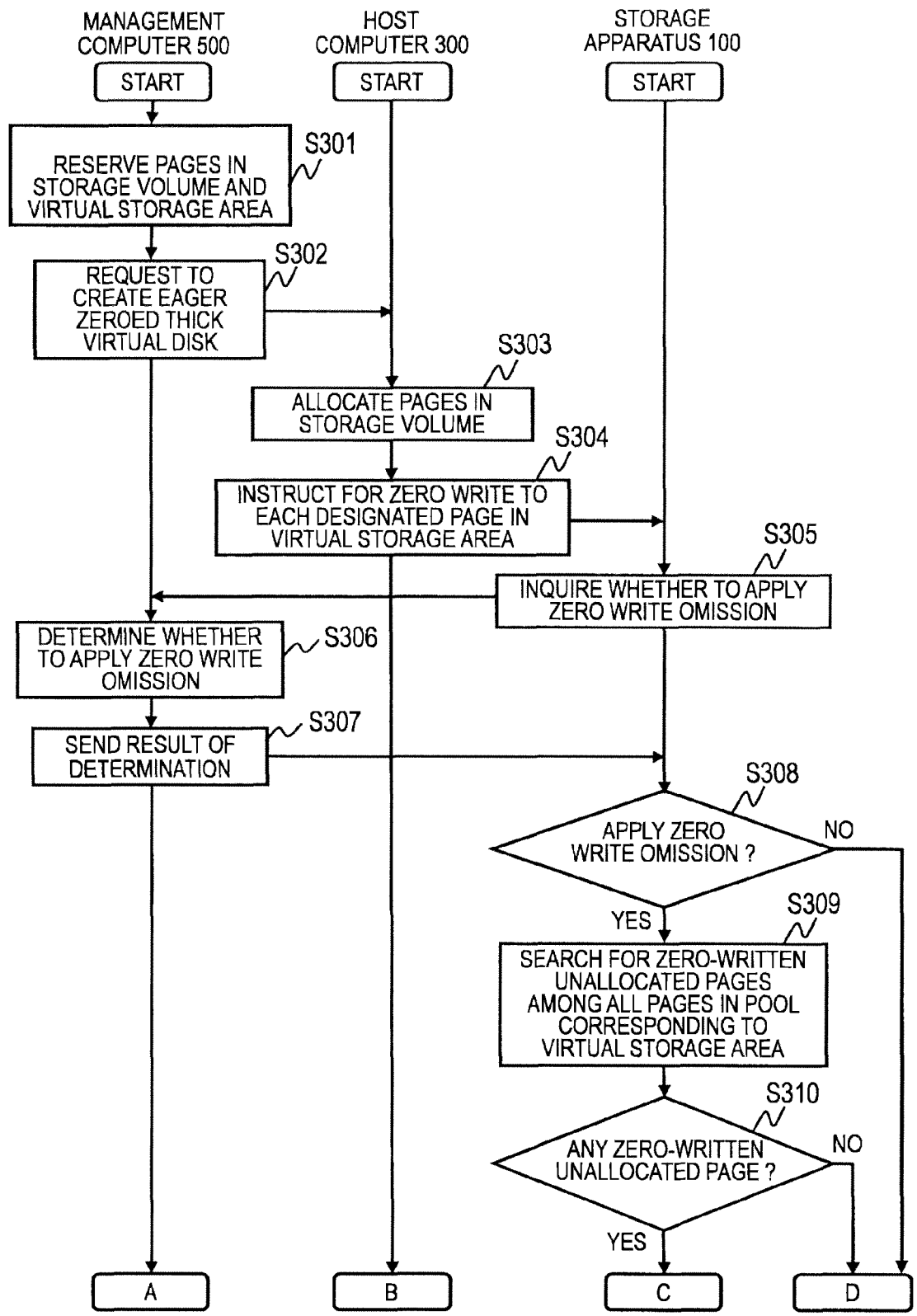
FIG. 21 is a flowchart illustrating an example of a procedure for creating an eager zeroed thick virtual disk in the first embodiment.
Figure 22:
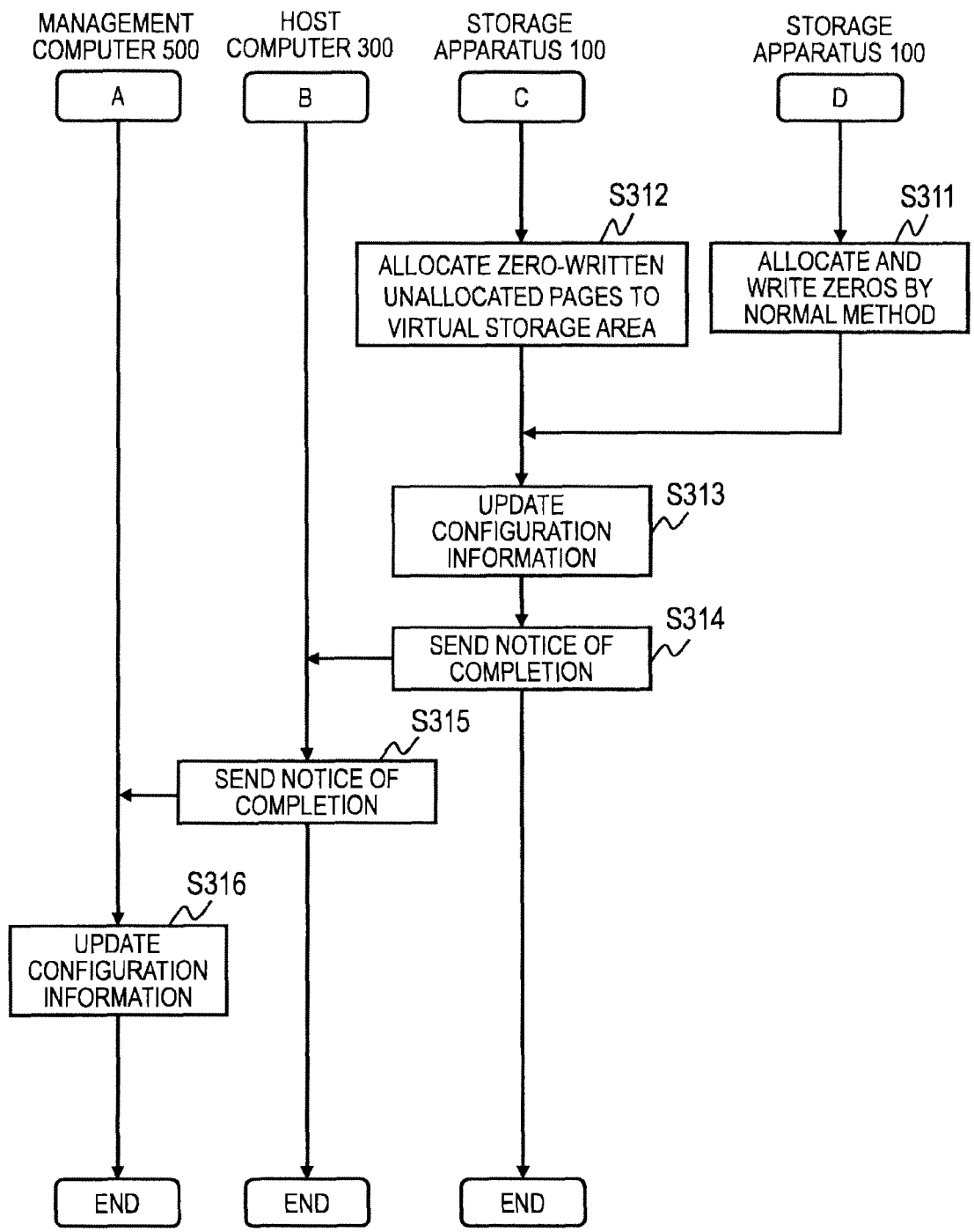
FIG. 22 is a flowchart illustrating an example of a procedure (2) for creating an eager zeroed thick virtual disk in the first embodiment.

FIGS. 21 and 22 illustrate a procedure for creating an eager zeroed thick virtual disk in the storage apparatus 100 in the form of flowcharts. This procedure is executed in the case where the disk type is selected as "eager zeroed" and the creation method is selected as the "shortened creation time method" in the virtual disk creation image in the operation image 5003 in the management computer 500 and in response to transmission of the information to the management computer 500.

For this process, pages 15 in a storage area 11 to which zeros have already been written are prepared. For example, when a page 15 in a storage area 11 is deallocated from a page 16 in a virtual storage area 10, zeros are written to the page 15. Prepared zero pages 15 are managed in the zero data management information 1005.

Upon receipt of the transmitted information, the virtual environment management program 5010 in the management computer 500 adds a row of the virtual disk identification information 50012 in the virtual disk management information 5001 and writes the information entered through the operation image 5003 to the virtual disk type 50013 and the zero write omission application information 50014.

With reference to the host computer storage area configuration information 3001 acquired from the host computer 300, the virtual environment configuration management program 5010 identifies the virtual storage area 10 corresponding to the storage volume 13 entered through the operation image, relates the pages 17 in the storage volume 13 to the pages 16 in the corresponding virtual storage area 10 and updates the storage volume page allocation information 5002 (step S301).

The virtual disk creation instruction program 5012 in the management computer 500 requests the host computer 300 to create an eager zeroed thick virtual disk, specifying the virtual machine 400 in which the virtual disk is to be created, the capacity, the pages 17 in the storage volume 13, and the pages 16 in the virtual storage area 10 (step S302). The pages 16 can be identified with, for example, the virtual storage area identification information and the page array.

Upon receipt of the request from the management computer 500, the virtual machine creation program 3012 in the host computer 300 reserves the pages 17 in the storage volume 13 and updates the virtual disk page allocation information 3003 (step S303).

The virtual machine creation program 3012 instructs the storage apparatus 100 to write zeros to each page 16, designating the pages 16 the management computer 500 specified. For example, to offload zero write to the storage apparatus 100, the program 3012 may issue a SCSI command of Write Same (step S304).

Upon receipt of the instruction for zero write from the host computer 300, the allocation method determination program 1015 in the storage apparatus 100 inquires whether to omit zero write for the page 16 the host computer 300 specified to the management computer 500 (step S305). The inquiry may be made, for example, page by page, or when the Write Same is repeatedly issued for a predetermined number of pages or more.

Upon receipt of the inquiry from the storage apparatus 100, the zero write-omitted thick virtual disk management program 5011 in the management computer 500 refers to the virtual disk management information 5001 and the storage volume page allocation information 5002 to determine whether to apply omission of zero write to the specified pages 16 (step S306) and sends the result of determination to the storage apparatus 100 (step S307).

If the storage apparatus 100 receives a notice to apply omission of zero write from the management computer 500 (Yes at step S308), it proceeds to step S309. If it receives a notice not to apply omission of zero write (No at step S308), it proceeds to step S311.

If the result of the determination at step S308 is Yes, the storage area configuration management program 1010 in the storage apparatus 100 refers to the virtual storage area configuration information 1001 and the pool configuration information 1002 to identify the storage area pool 12 and the logical storage area 11 in the pool for the specified virtual storage area 10.

The storage area configuration management program 1010 further refers to the page allocation management information 1003 and the zero data management information 1005 to search for pages 15 in the specified logical storage area 11 for which the allocation status 10035 indicates "Unallocated" and the zero write status 10053 indicates "zero" (step S309).

The storage area configuration management program 1010 determines whether the number of pages of the search result is equal to or more than the number of pages specified by the host computer 300 at step S304 (step S310). If the number of detected pages is equal to or more than the number of pages specified by the host computer 300 (Yes at step S310), the flow proceeds to step S312. On the other hand, if the number of detected pages is less than the number specified by the host computer 300 (No at step S310), the flow proceeds to step S311.

If No at step S308 or S310, the page allocation program 1014 refers to the page allocation management information 1003 and the virtual storage area page allocation information 1004 and allocates pages 15 for which the allocation status 10035 indicates "Unallocated" to the pages 16 for which the allocation status 10046 indicates "Null". The data write program 1011 performs zero write to the entire areas of the pages 15. That is to say, the page allocation program 1014 prepares pages for an eager zeroed thick virtual disk in the normal method (step S311).

If Yes at step S310, the page allocation program 1014 refers to the virtual storage area page allocation information 1004 and allocates unallocated and zero-written pages 15 detected in the search at step S309 to the pages 16 for which the allocation status 10046 indicates "Null" (step S312).

Upon completion of the allocation of pages 15 in the logical storage area 11 to the pages 16 in the virtual storage area 10, the storage area configuration management program 1010 updates the allocation status 10035 in the page allocation management information 1003 from "Unallocated" to "Allocated in eager zeroed", updates the allocation status 10046 in the virtual storage area page allocation information 1004 to "Allocated", and updates the logical storage area information 10042 with the information on the allocated pages 15 (step S313).

The storage area configuration management program 1010 in the storage apparatus 100 sends a notice of completion to the host computer 300 (step S314). Upon receipt of the notice of completion from the storage apparatus 100, the host computer storage area configuration management program 3010 or the virtual machine management program 3011 in the host computer 300 sends a notice of completion to the management computer 500 (step S315).

Upon receipt of the notice of completion from the host computer 300, the virtual environment configuration management program 5010 in the management computer 500 updates the configuration information 1001 to 1006 relating to the storage apparatus 100 (step S316). It should be noted that the management computer 500 may execute the procedures of FIGS. 19 and 20 instead of the step S316 to update the control information in the management computer 500.

As set forth above, this embodiment can prevent useless zero write and achieve shorter creation time in creating an eager zeroed thick virtual disk.

The foregoing configuration example manages virtual storage resources and real storage resources for pages on the page basis to allocate a page 15 initialized (zero-written) in advance to a virtual page 16. Another configuration example may prepare a logical storage area 12 initialized in advance and allocate the logical storage area 12 initialized in advance to a virtual storage area 10 in response to a Write Same command from the host computer 300. The technique of initialization in this embodiment can be applied to a storage apparatus that manages storage resources on a volume (such as virtual storage area) basis instead of on a page basis and also to other processing than creating an eager zeroed thick virtual disk.

The foregoing configuration example performs zero write to initialize pages 15 of real storage resources, but the method of initialization depends on the design of the storage apparatus. In the foregoing configuration example, the management computer 500 determines whether to apply zero write omission in response to an inquiry from the storage apparatus 100.

In another configuration example, the management computer 500 may send the storage apparatus 100 information on whether to apply zero write omission without receipt of an inquiry from the storage apparatus 100. For example, the management computer 500 can instruct the storage apparatus 100, in place of the host computer 300, for zero write and notify the storage apparatus 100 of whether to apply zero write omission.

In place of the storage apparatus 100, the management computer 500 may select unallocated zero-written pages 15 to be allocated to virtual pages 16. As explained with reference to FIG. 5, the management computer 500 has management information 1001 to 1006 on the storage apparatus 100; accordingly, it can select appropriate unallocated zero-written pages 15.

Second Embodiment

In this embodiment, the management computer 500 sends information indicating the pages to omit zero write to the storage apparatus 100 in advance. The storage apparatus 100 that receives a Write Same command from the host computer 300 determines whether to omit zero write by itself without inquiring it to the management computer 500. This configuration reduces the time from the receipt of the instruction for zero write to the completion of the processing.

Figure 23:
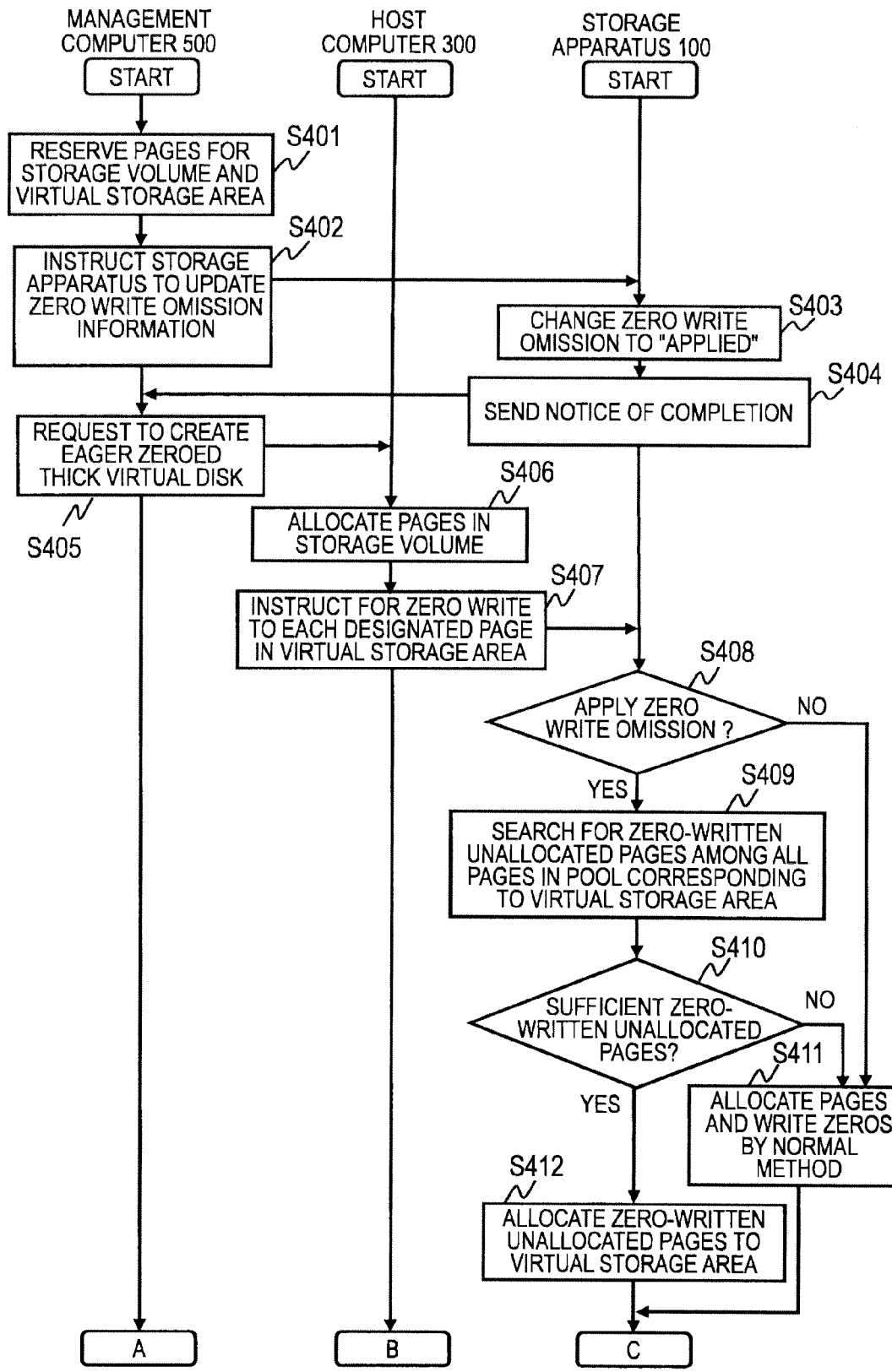
FIG. 23 is a flowchart illustrating an example of a procedure for creating an eager zeroed thick virtual disk in the second embodiment.
Figure 24:
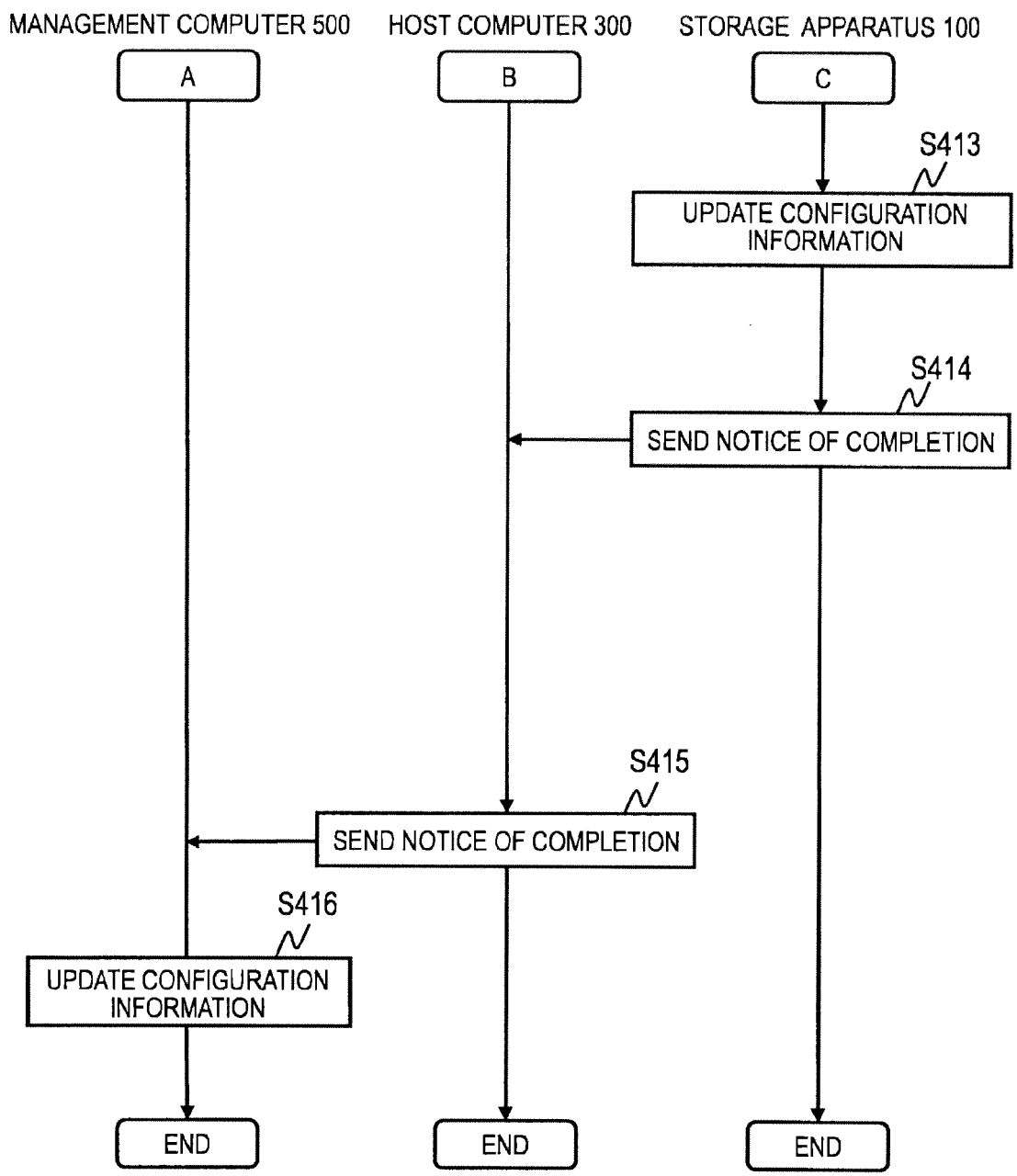
FIG. 24 is a flowchart illustrating an example of a procedure for creating an eager zeroed thick virtual disk in the second embodiment.

FIGS. 23 and 24 illustrate a procedure for creating an eager zeroed thick virtual disk in the zero write-omitted thick virtual disk storage apparatus 100 in the form of flowcharts. This procedure is executed in the case where the disk type is selected as "eager zeroed" and the creation method is selected as the "shortened creation time method" in the virtual disk creation image in the operation image 5003 in the management computer 500 and in response to transmission of the information to the management computer 500.

For this process, pages 15 in a storage area 11 to which zeros have already been written are prepared. For example, when a page 15 in a storage area 11 is deallocated from a page 16 in a virtual storage area 10, zeros are written to the page 15. Prepared zero pages 15 are managed in the zero data management information 1005. These are the same as in the first embodiment.

The virtual environment management program 5010 in the management computer 500 adds a row of the virtual disk identification information 50012 in the virtual disk management information 5001 and writes the information entered through the operation image 5003 to the virtual disk type 50013 and the zero write omission application information 50014.

With reference to the host computer storage area configuration information 3001 acquired from the host computer 300, the virtual environment configuration management program 5010 identifies the virtual storage area 10 corresponding to the storage volume 13 entered through the operation image, relates the pages 17 in the storage volume 13 to the pages 16 in the corresponding virtual storage area 10 and updates the storage volume page allocation information 5002 (step S401)

The zero write-omitted thick virtual disk management program 5011 in the management computer 500 sends an instruction to update the virtual disk creation method application status 1006 to the storage apparatus 100, designating the pages 16 of the virtual storage area 10 to apply zero write omission with reference to the virtual disk management information 5001 and the storage volume page allocation information 5002 (step S402).

The allocation method determination program 1015 in the storage apparatus 100 that has received the update instruction from the management computer 500 changes the zero write omission application status 10063 for the page 16 into "Applied" in the virtual disk creation method application status 1006 (step S403). The allocation method determination program 1015 sends a notice of completion to the management computer 500 after the end of step S403 (step S404).

The virtual disk creation instruction program 5012 in the management computer 500 requests the host computer 300 to create an eager zeroed thick virtual disk, specifying the virtual machine 400, the capacity thereof, the pages 17 in the storage volume 13, and the pages 16 in the virtual storage area 10 (step S405).

Upon receipt of the request from the management computer 500, the virtual machine creation program 3012 in the host computer 300 reserves the pages 17 in the storage volume 13 and updates the virtual disk page allocation information 3003 (step S406).

The virtual machine creation program 3012 in the host computer 300 instructs the storage apparatus 100 to write zeros to each page 16, designating the page 16 the management computer 500 specified. For example, to offload the zero write to the storage apparatus 100, an SCSI command of Write Same is issued (step S407).

The allocation method determination program 1015 in the storage apparatus 100 that has received the instruction for zero write from the host computer 300 determines whether to apply zero write omission with reference to the virtual disk creation method application status 1006 (step S408). Specifically, the designated page 16 is identified with the virtual storage area identification information and the page array. The allocation method determination program 1015 identifies the page identification information on the page 16 with reference to the virtual storage area page allocation information 1004 and searches the virtual disk creation method application status 1006 for an entry of the page 16 identified with the virtual storage area identification information and the page identification information.

If the zero write omission application status 10063 in the virtual disk creation method application status 1006 indicates "Applied" (Yes at step S408), the storage apparatus 100 proceeds to step S409 and if the application status 10063 indicates "Not applied" (No at step S408), the storage apparatus 100 proceeds to step S411.

If the result of the determination at step S408 is Yes, the storage area configuration management program 1010 in the storage apparatus 100 refers to the virtual storage area configuration information 1001 and the pool configuration information 1002 to identify the logical storage area 11 in the storage area pool 12 for the specified virtual storage area 10.

The storage area configuration management program 1010 further refers to the page allocation management information 1003 and the zero data management information 1005 to search for pages 15 in the specified logical storage area 11 for which the allocation status 10035 indicates "Unallocated" and the zero write status 10053 indicates "zero" (step S409).

The storage area configuration management program 1010 determines whether the number of pages of the search result is equal to or more than the number of pages specified by the host computer 300 at step S407 (step S410). If the number of detected pages is equal to or more than the number of pages specified by the host computer 300 (Yes at step S410), the storage apparatus 100 proceeds to step S412. On the other hand, if the number of detected pages is less than the number specified by the host computer 300 (No at step S410), the storage apparatus 100 proceeds to step S411.

If No at step S408 or S410, the page allocation program 1014 refers to the page allocation management information 1003 and the virtual storage area page allocation information 1004 and allocates pages 15 for which the allocation status 10035 indicates "Unallocated" to the pages 16 for which the allocation status 10046 indicates "Null".

The data write program 1011 performs zero write to the entire areas of the pages 15. That is to say, the storage apparatus 100 prepares pages for an eager zeroed thick virtual disk in the normal method (step S411).

If Yes at step S410, the page allocation program 1014 refers to the virtual storage area page allocation information 1004 and allocates unallocated and zero-written pages 15 detected in the search at step S409 to the pages 16 for which the allocation status 10046 indicates "Null" (step S412).

Upon completion of the allocation of pages 15 in the logical storage area 11 to the pages 16 in the virtual storage area 10, the storage area configuration management program 1010 updates the allocation status 10035 in the page allocation management information 1003 from "Unallocated" to "Allocated in eager zeroed", updates the allocation status 10046 in the virtual storage area page allocation information 1004 to "Allocated", and updates the logical storage area information 10042 with the information on the allocated pages 15 (step S413).

Thereafter, the storage area configuration management program 1010 sends a notice of completion to the host computer 300 (step S414). Upon receipt of the notice of completion from the storage apparatus 100, the host computer storage area configuration management program 3010 or the virtual machine management program 3011 in the host computer 300 sends a notice of completion to the management computer 500 (step S415).

Upon receipt of the notice of completion from the host computer 300, the virtual environment configuration management program 5010 in the management computer 500 updates the configuration information 1001 to 1006 relating to the storage apparatus 100 (step S416). It should be noted that the management computer 500 may execute the procedures of FIGS. 19 and 20 instead of the step S416 to update the control information in the management computer 500.

Third Embodiment

This embodiment explains omission of zero write in cloning a virtual machine. The storage apparatus is capable of creating (replicating) a virtual machine from a golden image of the virtual machine using a full copy function and/or a writable-difference copy function. In particular, this embodiment explains a method of creating a virtual machine including an eager zeroed thick virtual disk using copy. Compared with a method using a copy function of the host computer, data traffic can be reduced between the host computer and the storage apparatus and CPU cycles can be saved in the host.

The writable-difference copy function stores the data at the time of replication in the storage area of the copy source and stores a difference from the replication generated by a write to the storage area of the copy destination in a snapshot pool for difference storage. The cloning by the difference copy completes only by correlating information among the management tables and data is not replicated, so that the cloning can be performed faster than the method of physically replicating data (full copy). Consequently, a number of virtual machines can be created at high speed by cloning a virtual machine in cooperation with this difference copy.

In the meanwhile, since a copy source storage area can be retrieved from a full copy destination storage area, which is made by copying the copy source storage area, cloning a virtual machine using the writable-difference copy function while storing data common to virtual machines, such as an operating system, to the copy source storage area enables significant reduction in consumption of storage area.

As explained above, the writable-difference copy enables reduction in consumption of storage area and faster replication; however, access performance is inferior compared with when this copy is not applied. The full copy does not cause such degradation in access performance after the replication because the copy destination is independent from the copy source; however, replication time is longer than in the writable-difference copy because all allocated pages are to be copied entirely.

A configuration example explained by this embodiment provides a virtual machine satisfying user's requirements, by selecting either the writable-difference copy or full copy in copying a thick virtual disk depending on the characteristics of the virtual machine 400 to be created. Deallocating zero pages before copying enables copy of only the pages that have actually been written. Furthermore, full copy omits zero write and allocates zero-written pages prepared in advance, so that useless processing can be omitted to achieve a shorter creation time.

Figure 25:
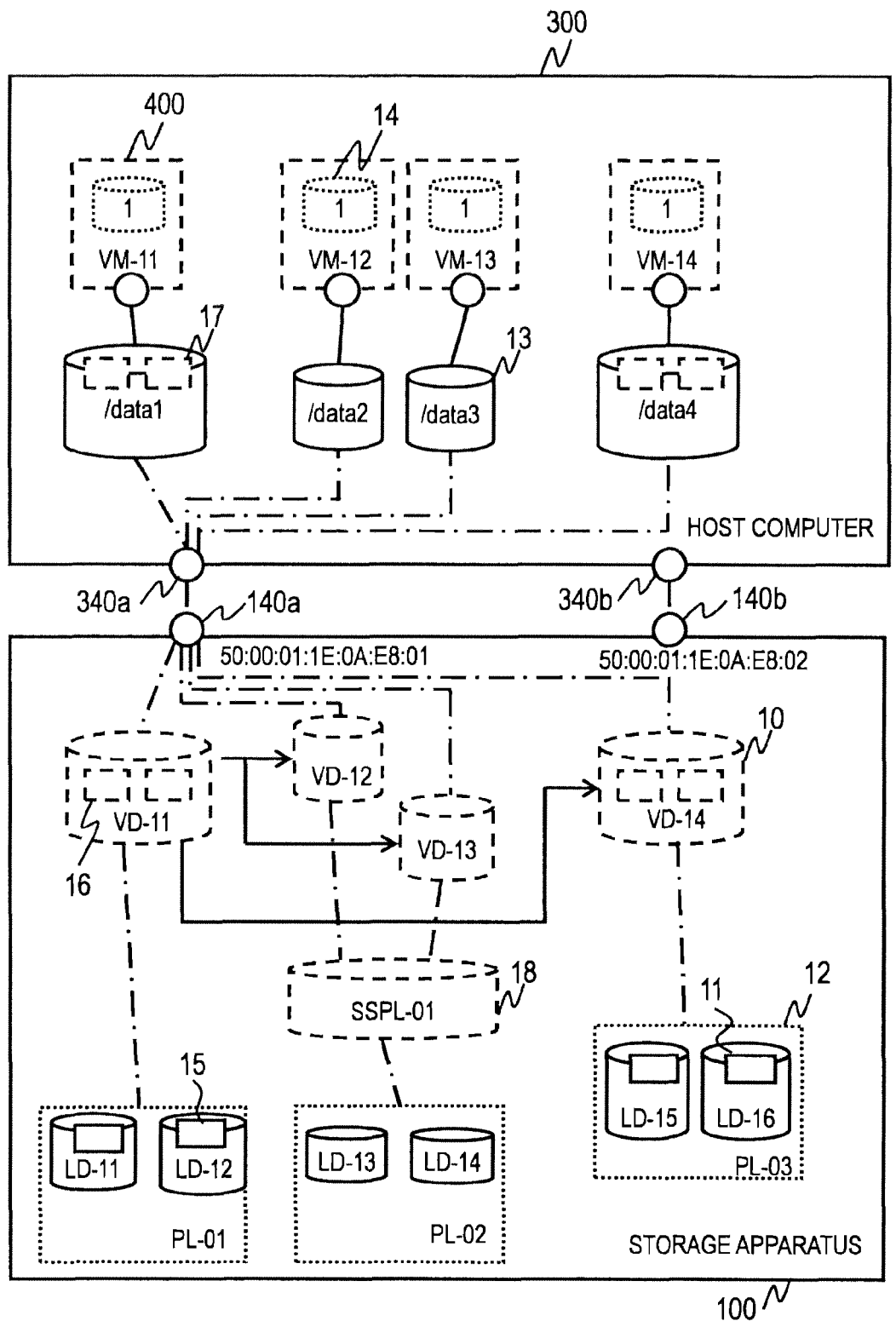
FIG. 25 is a drawing illustrating a configuration example of page allocation in the third embodiment.

FIG. 25 depicts a configuration example of the host computer 300 and the storage apparatus 100 to create multiple virtual machines 400 using the writable-difference copy function and the full copy function of the storage apparatus 100 in a form of a logical diagram.

A virtual storage area VD-11 retains a virtual machine VM-11. Virtual storage areas VD-12 and VD-13 each form a writable-difference snapshot from the virtual storage area VD-11. The data before writing to the virtual storage area VD-12 and the virtual storage area VD-13, or the data composing the virtual machine VM-11, is stored in a logical storage area LD-11 or LD-12 in a storage area pool PL-01 related to the virtual storage area VD-11.

If some data is written to the virtual storage area VD-12 or VD-13, the data is stored in a logical storage area LD-13 or LD-14 in a storage area pool PL-02 corresponding to a snapshot pool SSPL-01 prepared for the virtual storage areas VD-12 and VD-13.

The virtual storage area VD-12 corresponds to a storage volume /data2. The host computer 300 can create a virtual machine VM-12, which is a replica of the virtual machine VM-11, by mounting the storage volume /data2.

In the meanwhile, the virtual storage area VD-11 and the virtual storage area VD-14 are full copies of each other; replicated data of the virtual storage area VD-11 is stored in the virtual storage area VD-14. The virtual storage area VD-14 corresponds to a storage volume /data4; accordingly, a virtual machine VM-14, which is a replica of the virtual machine VM-11, can be created by mounting the storage volume /data4 from the host computer 300.

Figure 26:
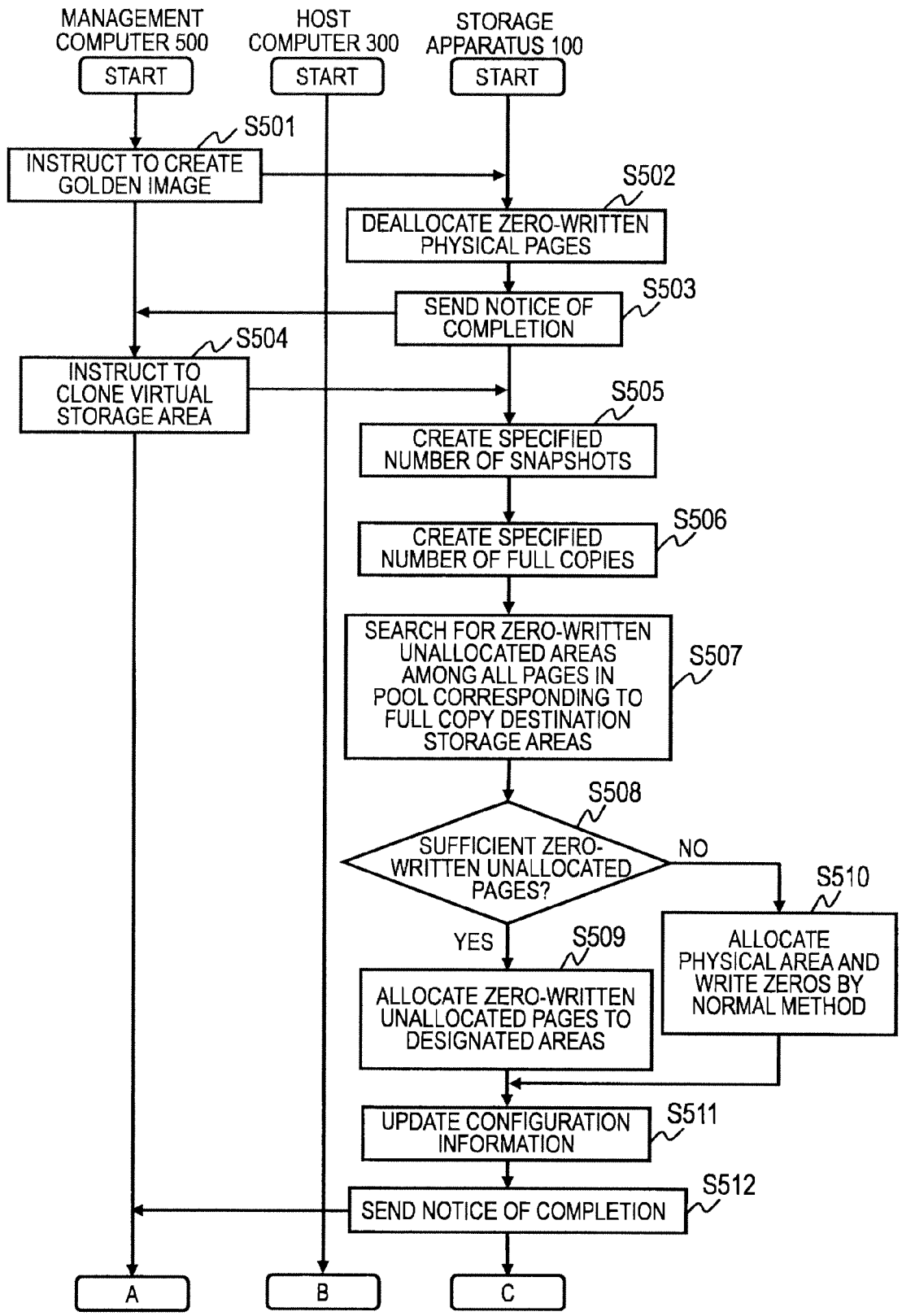
FIG. 26 is a flowchart illustrating an example of a procedure for creating virtual machines in cooperation with the replication function of the storage apparatus in the third embodiment.
Figure 27:
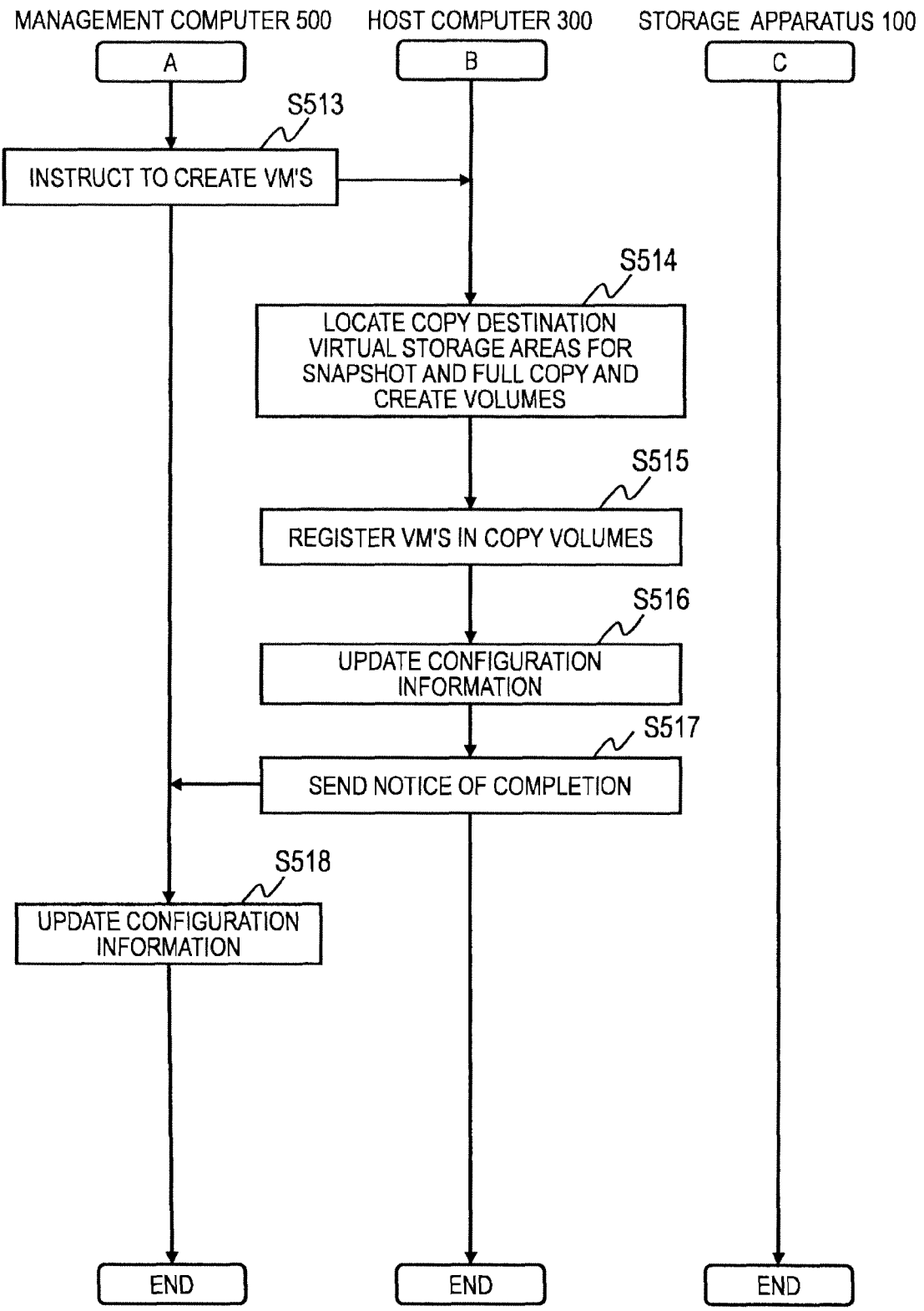
FIG. 27 is a flowchart illustrating an example of a procedure for creating virtual machines in cooperation with the replication function of the storage apparatus in the third embodiment.

FIGS. 26 and 27 illustrate a procedure for creating a virtual machine 400 in the form of flowcharts. The procedure is executed by the management computer 500, the host computer 300, and the storage apparatus 100 in cooperation with the writable-difference copy function and the full copy function of the storage apparatus 100. It should be assumed that a copy source virtual machine 400 held in a copy source virtual storage area 10 will never be written.

This is because, if the copy source virtual storage area 10 is written after creation of a writable-difference copy (snapshot), the data at the replication is backed up to the snapshot pool 18, so that read accesses are gathered to the snapshot pool 18 which does not expect intensive access; consequently, read performance degrades more significantly than in the case where read accesses are gathered to the copy source virtual storage area 10.

This procedure starts when the "shortened creation time method" is selected in a virtual machine creation image of the operation image 5003 in the management and if one or more virtual disks 14 corresponding to the copy source virtual machine 400 include one or more "eager zeroed" type disks.

Figure 28:
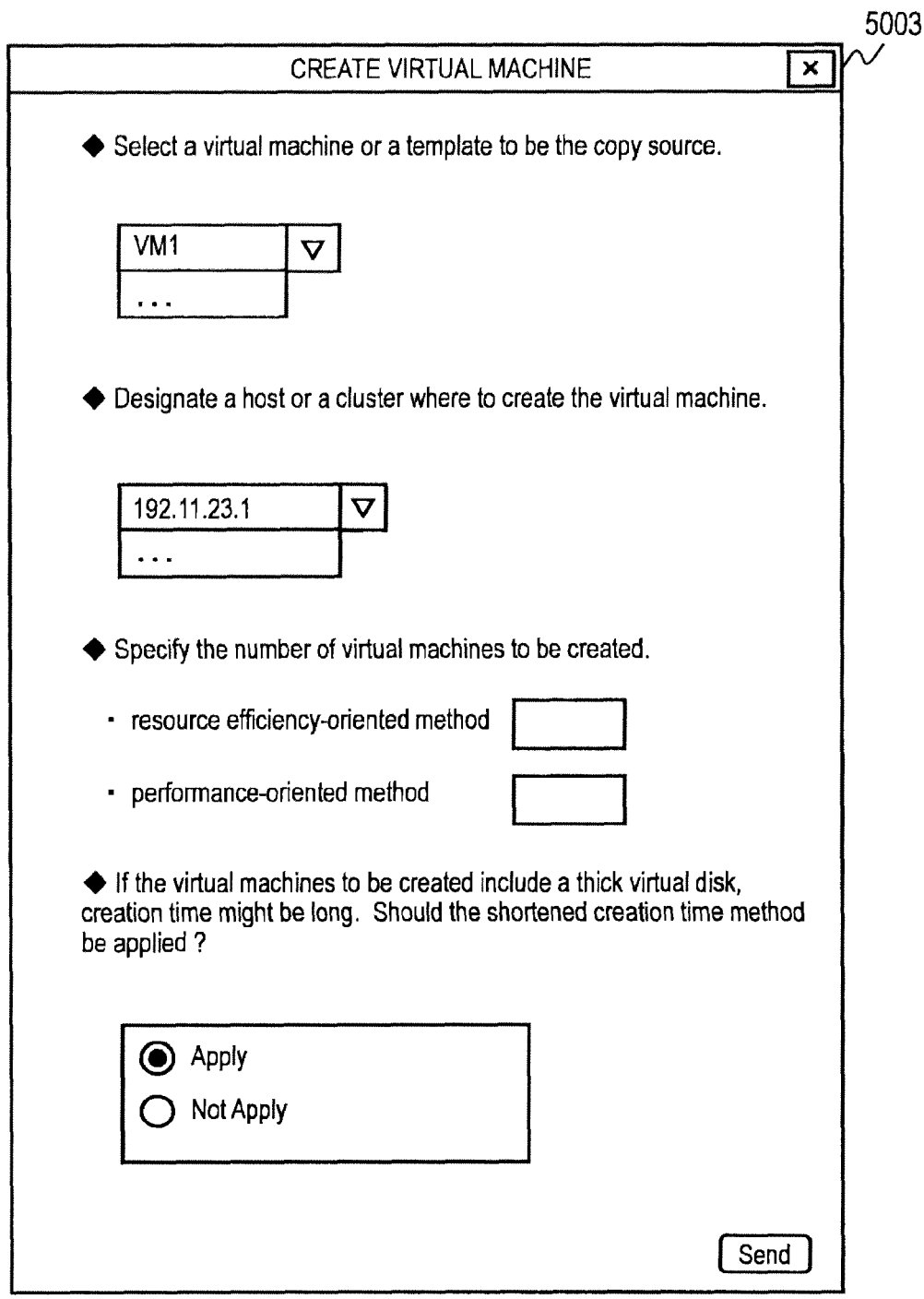
FIG. 28 is a drawing illustrating a configuration example of an operation image in the third embodiment.

FIG. 28 is a configuration example of the operation image 5003 displayed by the management computer 500. The administrator can execute creation of virtual machines 400 through this image. The administrator specifies a virtual machine 400 to be the copy source, a host computer 300 where to create the virtual machines, the number of virtual machines 400 to be created, and whether to apply the shortened creation time method.

In specifying the number of virtual machines 400 to be created, the administrator specifies the numbers separately for "resource efficiency-oriented method" and "performance-oriented method". The number for the "resource efficiency-oriented method" corresponds to the number of times of difference copy (the number of snapshots). The number for the "performance-oriented method" corresponds to the number of times of full copy (the number of full clones).

The shortened creation time method can be applied only in creating virtual machines 400 by the performance-oriented method. For this reason, the operation image 5003 may be configured to disable the selection of the shortened creation time method if "0" is entered in the field of the number for the "performance-oriented method". The creation of virtual machines illustrated in FIGS. 26 and 27, which will be described hereinafter, starts upon selection of "Send" in this image.

The virtual machine cloning instruction program 5013 in the management computer 500 searches the virtual machine identification information 50021 in the storage volume page allocation information 5002 for the copy source virtual machine 400 specified in the operation image 5003. The virtual machine cloning instruction program 5013 sends the storage apparatus 100 an instruction for creating a golden image, specifying the virtual storage area 10 corresponding to the virtual machine 400 with reference to the virtual storage area identification information 50027 (step S501).

Upon receipt of the creation instruction, the zero data management program 1013 in the storage apparatus 100 refers to the virtual storage area page allocation information 1004 and the zero data management information 1005 and determines the areas for which the zero write status 10053 indicates "zero" among the pages 15 in the logical storage area 11 corresponding to the pages 16 in the designated virtual storage area 10.

The page allocation program 1014 deallocates the determined pages 15 from the pages 16 and records the value "Null" in the logical storage area information 10042 for the pages in the virtual storage area page allocation information 1004 (step S502).

If full copy is performed without executing the step S502, all areas allocated to the virtual disk 14 are copied. Accordingly, even if little data has been written because of, for example, merely being mounted, considerable time might be required.

The page allocation program 1014 sends a notice of completion to the management computer 500 (step S503). Upon receipt of the notice of completion from the storage apparatus 100, the virtual machine cloning instruction program 5013 in the management computer 500 instructs the storage apparatus 100 to execute writable-difference copy and full copy, specifying the copy source virtual storage area 10 and the number of difference clones and full clones based on the respective entries to the operation image 5003 (step S504).

Upon receipt of the instruction from the management computer 500, the difference data recording program 1016 in the storage apparatus 100 creates difference copy pairs of the copy source storage area 10 and the copy destination storage areas 10 in the number specified for the "resource efficiency-oriented method" (step S505). Furthermore, the data replication program 1017 creates full copy pairs of the copy source virtual storage area 10 and the copy destination virtual storage areas 10 in the number specified for the "performance-oriented method" (step S506).

The storage area configuration management program 1010 identifies the logical storage areas 11 in the storage pool 12 corresponding to the copy destination virtual storage areas 10 in full copy, with reference to the virtual storage area configuration information 1001 and the pool configuration information 1002. The storage area configuration management program 1010 refers to the page allocation management information 1003 and the zero data management information 1005 and searches for pages 15 for which the allocation status 10035 indicates "Unallocated" and the zero write status 10053 indicates "zero" among the pages 15 in the identified logical storage areas 11 (step S507).

The storage area configuration management program 1010 determines whether the number of pages detected in the search is equal to or more than the number of pages deallocated at step S502 (step S508). If the result of the determination indicates that the number of detected pages is equal to or more than the number of pages deallocated at step S502 (Yes at step S508), the storage apparatus 100 proceeds to step S509. On the other hand, if the number of detected pages is less than the number of pages deallocated at step S502 (No at step S508), the storage apparatus 100 proceeds to step S510.

If Yes at step S508, the page allocation program 1014 refers to the virtual storage area page allocation information 1004 and allocates zero-written and unallocated pages 15 detected by the search at step S507 to the pages 16 for which the allocation status 10046 indicates "Null" (step S509).

If No at step S508, the page allocation program 1014 refers to the page allocation management information 1003 and the virtual storage area page allocation information 1004 and allocates pages 15 for which the allocation status 10035 indicates "Un-allocated" to the pages 16 for which the allocation status 10046 indicates "Null". The data write program 1011 performs zero write to the entire areas in the allocated pages 15. In other words, the storage apparatus 100 prepares pages for eager zeroed thick virtual disks by the normal method (step S510).

Upon completion of the allocation of the pages 15 in the logical storage areas 11 to the pages 16 in the virtual storage areas 10, the storage area configuration management program 1010 updates the allocation status 10035 in the page allocation management information 1003 from "Unallocated" to "Allocated in eager zeroed" and updates the logical storage area information 10042 with the information on the allocated pages 15 (step S511).

The storage area configuration management program 1010 in the storage apparatus 100 sends a notice of completion to the management computer 500 (step S512). Upon receipt of the notice of completion from the storage apparatus 100, the virtual machine cloning instruction program 5013 in the management computer 500 instructs the host computer 300 to create virtual machines 400 from replicated data, designating all the virtual storage areas 10 designated as the copy destinations of writable-difference copy and full copy (step S513).

Upon receipt of the instruction from the management computer 500, the virtual machine creation program 3012 in the host computer 300 locates the designated copy destination virtual storage areas 10 and creates storage volumes 13 (step S514). The virtual machine creation program 3012 further retrieves data to compose each virtual machine 400 from the storage volumes 13 and registers it as the virtual machine 400 (step S515).

The host computer storage area configuration management program 3010 updates the host computer storage area configuration information 3001, the virtual machine configuration information 3002, and the virtual disk page allocation information 3003 (step S516) and sends a notice of completion to the management computer 500 (step S517).

Upon receipt of the notice of completion from the host computer 300, the virtual environment configuration management program 5010 in the management computer 500 updates the virtual disk management information 5001 and the storage volume page allocation information 5002 (step S518).

The foregoing example determines the storage destination for each virtual machine 400, but the system may be configured to determine the storage destination for each virtual disk 14 if a virtual machine 400 has a plurality of virtual disks 14.

For example, if a virtual machine 400 has virtual disks different in write/read characteristics like virtual disks for an OS and for user data, a virtual storage area 10 for difference copy may store the OS commonly read by the created virtual machines 400 and a normal virtual storage area 10 may store user data to which frequent writes are expected.

In the configuration where the storage destination is determined for each virtual disk, the storage apparatus 100 clones all the virtual machines 400 by writable difference copy after the deallocation of zero data; then, the page migration program 1012 perform migration of only the virtual disks 14 for data storage in the copy destination virtual storage areas 10 to normal virtual storage areas 10. After the migration, the storage apparatus 100 detects and allocates zero-written pages as in the above-described method. Deallocating zero data pages before the migration leads to reduction in time for migration of the virtual disks 14.

The foregoing configuration examples use both of the writable difference copy and the full copy; however, the technique of this invention is applicable to a system employing only one of them. The foregoing examples omit zero write and allocate pages to which zeros have already been written in full copy, but the same processing may be performed in writable-difference copy.

As set forth above, embodiments of this invention have been explained, but this invention is not limited to the foregoing embodiments. Those skilled in the art can easily change, add, or convert the elements in the foregoing embodiments within the scope of this invention.

A part of the configuration of one embodiment may be replaced with that of another embodiment and the configuration of one embodiment may be incorporated to another embodiment. A part of the configuration of each embodiment may be added, deleted, or replaced by that of a different configuration.

It is needless to add that this invention can he achieved by providing a non-transitory storage medium, such as a DVD-RW or a DVD-R, storing program codes of the software for implementing the functions in the foregoing embodiments to the system or an apparatus and reading and executing the program codes held in the storage medium with a computer (or a CPU or an MPU) in the system or the apparatus.

In such a case, the program codes themselves retrieved from the storage medium implement the functions in the foregoing embodiments. This means the storage medium holding the program codes is an element of this invention. The functions of the foregoing embodiments can he implemented not only by executing the program codes retrieved by a computer but also by that the operating system (OS) running on the computer in accordance with instructions of the program codes performs a part or all of the actual processing.

REFERENCE SIGNS LIST

10 Virtual storage area
11 Logical storage area
12 Storage area pool
13 Storage volume
14 Virtual disk
15 Logical storage area page
16 Virtual storage area page
17 Storage volume page
18 Snapshot pool
100 Storage apparatus
120 Magnetic storage device
140 Data input/output communication interface
150 Management communication interface
160 Data input/output cache memory
190 Storage controller
200 Network connection apparatus
300 Host computer
320 Magnetic storage device
340 Data input/output communication interface
350 Management communication interface
360 Data input/output cache memory
370 Input interface
375 Output interface
380 Arithmetic processing unit
390 Bus
400 Virtual machine
420 Magnetic storage device
440 Data input/output communication interface
450 Management communication interface
460 Data input/output cache memory
470 Input interface
475 Output interface
480 Arithmetic processing unit
490 Bus
500 Management computer
520 Magnetic storage device
550 Management communication interface
560 Data input/output cache memory
570 Input interface
575 Output interface
580 Arithmetic processing unit
590 Bus
600 Management network
1000 Program memory
1001 Virtual storage area configuration information
1002 Pool configuration information
1003 Page allocation management information
1004 Virtual storage area page allocation information
1005 Zero data management information
1006 Virtual disk creation method application status
1010 Storage area configuration management program
1011 Data write program
1012 Page migration program
1013 Zero data management program
1014 Page allocation program
1015 Allocation method determination program
1016 Difference data recording program
1017 Data replication program
3001 Host computer storage area configuration information
3002 Virtual machine management information
3003 Virtual disk page allocation information
3010 Host computer storage area configuration management program
3011 Virtual machine management program
3012 Virtual machine creation program
3013 Data write instruction program
3014 Virtual machine migration program
3015 Server virtualization program
4000 Program memory
4001 Application
4002 Operating system
5000 Program memory
5001 Virtual disk management information
5002 Storage volume page allocation information
5003 Operation image
5010 Virtual environment configuration management program
5011 Zero write-omitted thick virtual disk management program
5012 Virtual disk creation instruction program
5013 Virtual machine cloning instruction program

The invention claimed is:

1. A storage apparatus comprising:
one or more storage drives for providing real storage resources; and
a controller configured to control the one or more storage drives and accesses from a host computer,
wherein the controller is configured to initialize real storage resources and to include management information for managing the initialized real storage resources;
wherein the controller is configured to receive an instruction for allocating an initialized real storage resource to a first virtual storage resource accessed by the host computer;
wherein, in response to the instruction, the controller is configured to receive a determination whether unallocated initialized real storage resources exist with reference to the management information; and
wherein, when the determination is positive, the controller is configured to allocate a first initialized real storage resource selected from the management information to the first virtual storage resource without further initializing the selected first initialized real storage resource.

2. A storage apparatus according to claim 1,
wherein, in response to the instruction, the controller is configured to receive a result of an inquiry whether to allocate an initialized real storage resource which has been initialized in advance prior to the instruction to the first virtual storage resource to a management system;

wherein, in a case where the reply to the inquiry from the management system is positive, the controller is configured to allocate the first initialized real storage resource to the first virtual storage resource; and wherein, in a case where a reply to the inquiry from the management system is negative, the controller is configured to newly initialize a real storage resource and to allocate the newly initialized real storage resource to the first virtual storage resource.

3. A storage apparatus according to claim 1, wherein the controller is configured to determine whether to allocate an initialized real storage resource which has been initialized in advance prior to the instruction to the first virtual storage resource with reference to the management information;

wherein, in a case where a result of the determination is positive, the controller is configured to allocate the first initialized real storage resource to the first virtual storage resource; and wherein, in a case where a result of the determination is negative, the controller is configured to newly initialize a real storage resource and to allocate the newly initialized real storage resource to the first virtual storage resource.

4. A storage apparatus according to claim 1, wherein the one or more storage drives provide a pool area including a plurality of real pages;

wherein the first virtual storage resource comprises virtual pages in a virtual storage area; and wherein the controller, in response to the instruction, is configured to select an initialized real page for the first initialized real storage resource from unallocated initialized real pages with reference to management information for managing initialized real pages.

5. A storage apparatus according to claim 4, wherein the instruction instructs the controller to initialize a plurality of virtual pages in a virtual storage area including the first virtual storage resource to create the virtual storage area to be accessed by a virtual machine in the host computer; and wherein the controller is configured to allocate an unallocated initialized real page which has been initialized in advance prior to the instruction to each of the plurality of virtual pages with reference to the management information for managing initialized real pages.

6. A storage apparatus according to claim 1, wherein the instruction instructs the controller to create a clone of a virtual storage area allocated to a virtual machine in the host computer; and wherein the controller is configured to allocate the first initialized real storage resource to the first virtual storage resource included in a copy destination of the virtual storage area in accordance with the instruction.

7. A storage apparatus according to claim 6, wherein the instruction instructs the controller for full copy of the virtual storage area.

8. A storage apparatus according to claim 6, wherein the controller is configured to release initialized real storage resources allocated to the virtual storage area.

9. A computer system comprising:

a storage apparatus for providing a host computer with storage resources; and a management system configured to manage the storage apparatus, wherein the storage apparatus is configured to initialize real storage resources and to manage the initialized storage resources;

wherein the storage apparatus is configured to receive an instruction for allocating an initialized real storage resource to a first virtual storage resource to be accessed by the host computer;

wherein the storage apparatus allocates an unallocated first initialized real storage resource which has been initialized in advance prior to the instruction to the first virtual storage resource without further initializing the unallocated first initialized real storage resource.

10. A computer system according to claim 9, wherein, in response to the instruction, the storage apparatus is configured to inquire whether to allocate an initialized real storage resource which has been initialized in advance prior to the instruction to the first virtual storage resource to the management system;

wherein, in response to the inquiry, the management computer is configured to determine whether to allocate an initialized real storage resource to the first virtual storage resource with reference to management information for managing methods of initializing virtual storage resources and to send a result of the determination to the storage apparatus;

wherein, in a ease where the result of the determination is positive, the storage apparatus is configured to allocate the first initialized real storage resource to the first virtual storage resource; and wherein, in a case where the result of the determination is negative, the storage apparatus is configured to newly initialize a real storage resource selected from the management information and to allocate the newly initialized real storage resource to the first virtual storage resource.

11. A computer system according to claim 9, wherein the management system is configured to receive a designation of a method of initializing a storage resource to be accessed by a virtual machine;

wherein the management system is configured to send information indicating a method of initializing the first virtual storage resource in accordance with the designation; and wherein the storage apparatus is configured to initialize the first virtual storage resource in accordance with the information.

12. A computer system according to claim 9, wherein the instruction is an instruction from the management system for creating a clone of a virtual storage area allocated to a virtual machine in the host computer; and wherein the storage apparatus is configured to allocate the first initialized real storage resource to the first virtual storage resource included in a copy destination of the virtual storage area in accordance with the instruction.

13. A control method for a storage apparatus including one or more storage drives for providing real storage resources, the method comprising:

initializing real storage resources in advance and managing the initialized real storage resources;

receiving an instruction for initializing a first virtual storage resource to be accessed by a host computer; and allocating an unallocated initialized real storage resource to the first virtual storage resource in response to the instruction for initialization without further initializing the unallocated initialized real storage resource.

14. A control method for a storage apparatus according to claim 13, wherein the instruction instructs the storage apparatus to create a clone of a virtual storage area allocated to a virtual machine in the host computer; and wherein the allocating allocates the first initialized real storage resource to the first virtual storage resource included in a copy destination of the virtual storage area in accordance with the instruction.

\* \* \* \* \*